(12) United States Patent
Aggarwal et al.

(10) Patent No.: US 11,705,133 B1
(45) Date of Patent: Jul. 18, 2023

(54) UTILIZING SENSOR DATA FOR AUTOMATED USER IDENTIFICATION

(71) Applicant: Amazon Technologies, Inc., Seattle, WA (US)

(72) Inventors: Manoj Aggarwal, Seattle, WA (US); Dmitri Veikherman, Haifa (IL)

(73) Assignee: Amazon Technologies, Inc., Seattle, WA (US)

( * ) Notice: Subject to any disclaimer, the term of this patent is extended or adjusted under 35 U.S.C. 154(b) by 170 days.

(21) Appl. No.: 16/212,318

(22) Filed: Dec. 6, 2018

(51) Int. Cl.
| | | |
|---|---|---|
| *G10L 15/00* | (2013.01) | |
| *G10L 17/00* | (2013.01) | |
| *G06Q 30/0601* | (2023.01) | |
| *G10L 17/06* | (2013.01) | |
| *G06V 40/16* | (2022.01) | |

(52) U.S. Cl.
CPC .......... *G10L 17/00* (2013.01); *G06Q 30/0641* (2013.01); *G06V 40/172* (2022.01); *G10L 17/06* (2013.01)

(58) Field of Classification Search
CPC ..... G10L 17/00; G10L 17/06; G06K 9/00288; H04M 1/65; H04M 9/001; H04M 11/025; H04M 9/00; H04R 1/406
USPC ............................ 704/235, 246, 260; 700/94
See application file for complete search history.

(56) References Cited

U.S. PATENT DOCUMENTS

| | | | |
|---|---|---|---|
| 9,117,106 B2 | 8/2015 | Dedeoglu et al. | |
| 9,235,928 B2 | 1/2016 | Medioni et al. | |
| 9,473,747 B2 | 10/2016 | Kobres et al. | |
| 9,973,627 B1* | 5/2018 | Allison | H04M 1/72591 |
| 10,402,553 B1* | 9/2019 | Johnson | G06K 9/00288 |
| 2013/0284806 A1 | 10/2013 | Margalit | |
| 2014/0081634 A1* | 3/2014 | Forutanpour | G10L 15/26 704/235 |
| 2016/0162254 A1* | 6/2016 | Benattar | H04R 25/505 700/94 |
| 2021/0306744 A1* | 9/2021 | Mehra | H04R 1/406 |

* cited by examiner

*Primary Examiner* — Md S Elahee
(74) *Attorney, Agent, or Firm* — Lee & Hayes, P.C.

(57) ABSTRACT

This disclosure describes techniques for identifying users that are enrolled for use of a user-recognition system. To be identified using the user-recognition system, a user may first enroll in the system by stating an utterance at a first device having a first microphone. In response, the first microphone may generate first audio data. Later, when the user would like to be identified by the system, the user may state the utterance again, although this time to a second device having a second microphone. This second microphone may accordingly generate second audio data. Because the acoustic response of the first microphone may differ from the acoustic response of the second microphone, however, this disclosure describes techniques to apply a relative transfer function to one or both of the first or second audio data prior to comparing these data so as to increase the recognition accuracy of the system.

22 Claims, 18 Drawing Sheets

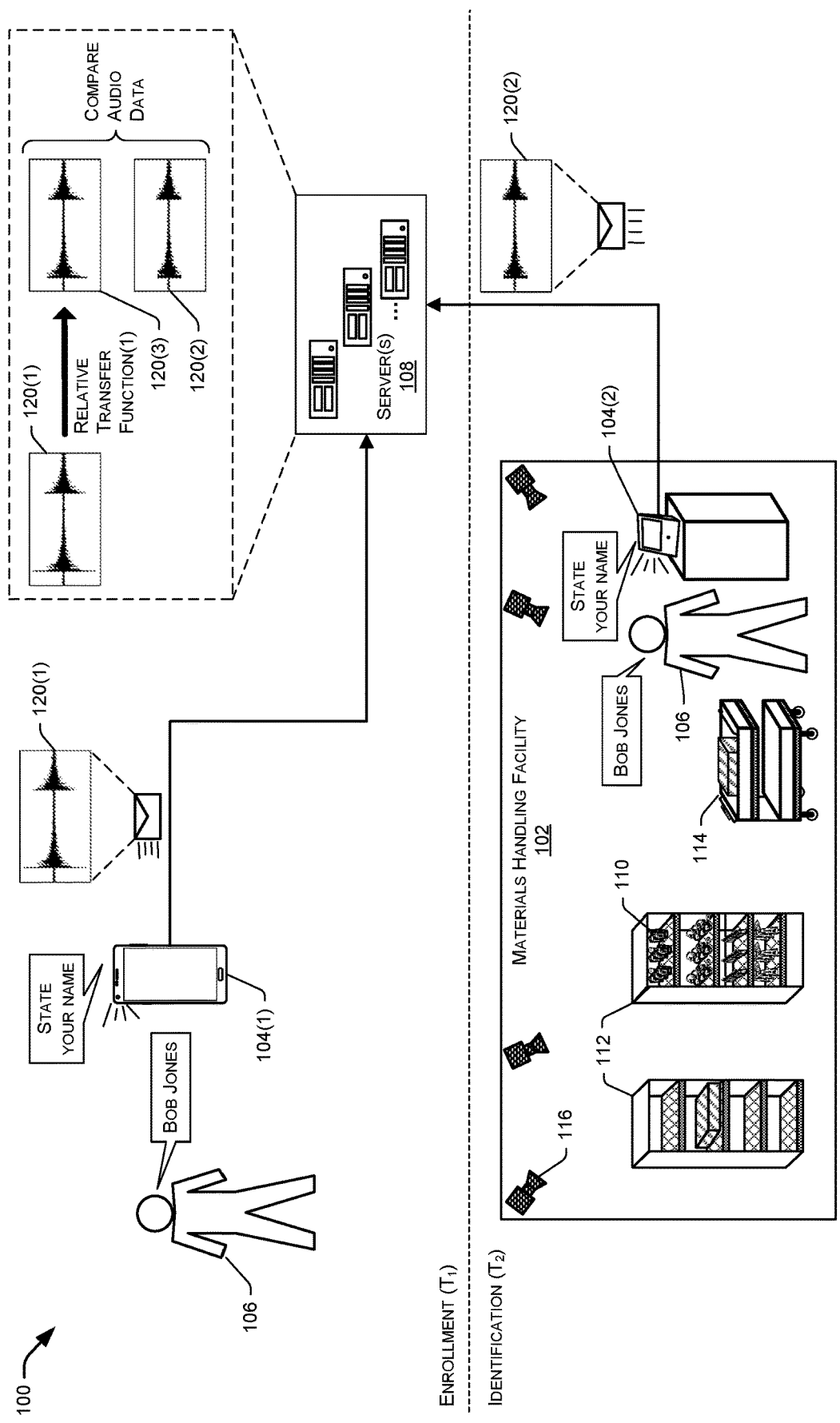

UTILIZING SENSOR DATA FOR AUTOMATED USER IDENTIFICATION

BACKGROUND

Retailers, wholesalers, and other product distributors often manage physical stores that utilize cashiers or dedicated self-checkout stands to finalize transactions with customers. During these traditional checkout processes, customers may have to carry and use physical objects for payment or identification, such a credit card or debit card, a driver's license, a phone, and so forth. In the future, physical stores may utilize various types of sensors to allow users to acquire and pay for items without cashiers or dedicated self-checkout stands. In some examples, it may be desirable to identify customers using methods that do not require the use of physical objects, and charge the appropriate customer accounts for items taken from the physical stores by the customers.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1A illustrates an example environment in which a user may enroll with a user-recognition device and an environment in which the user may be recognized by the user-recognition system after enrollment.

DETAILED DESCRIPTION

Figure 1B:
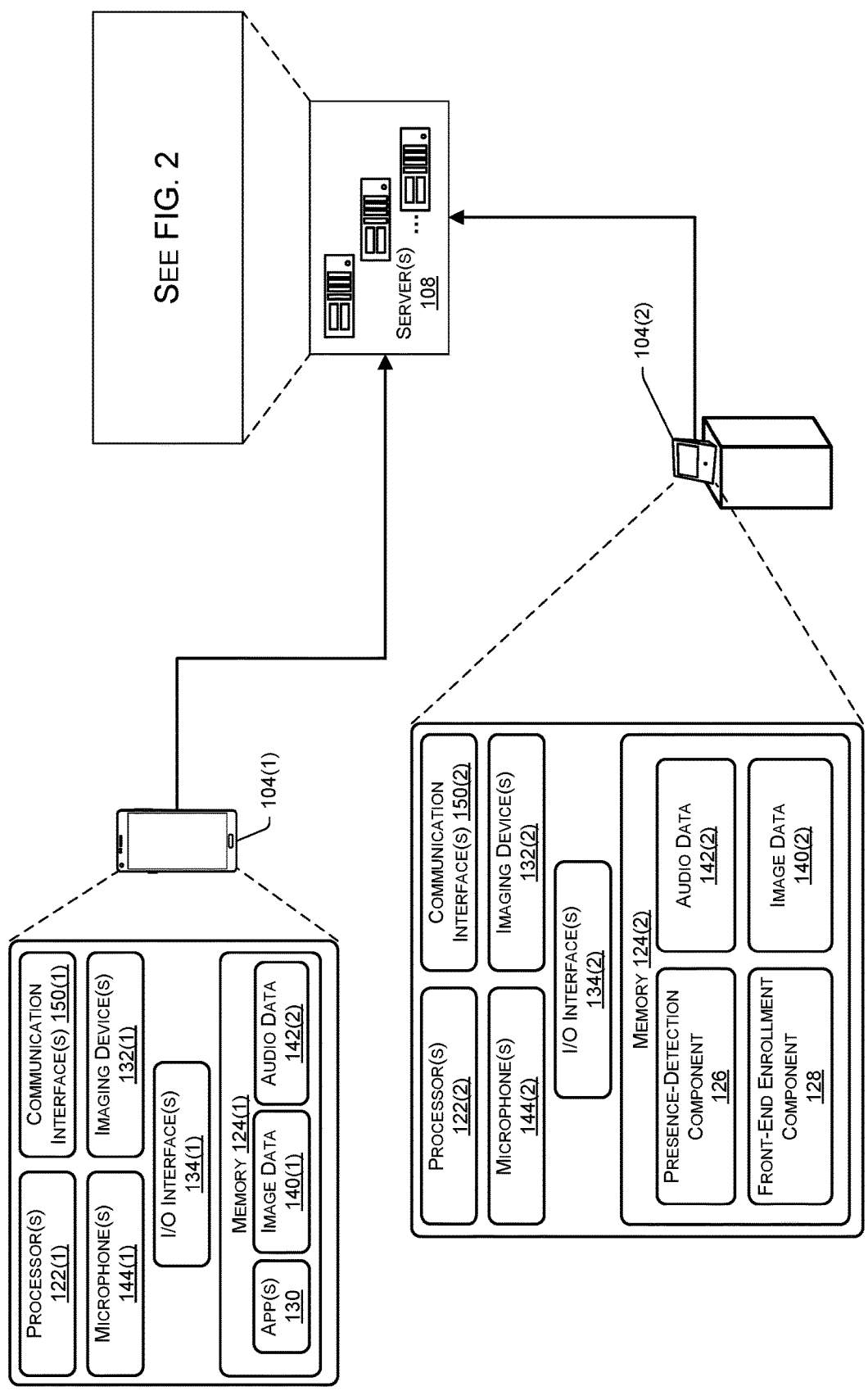
FIG. 1B illustrates example components of a first device with which a user enrolls with the user-recognition system and a second device used by the system for later recognizing the user.

This disclosure describes systems and techniques for identifying users using facial-recognition techniques and/or speech-recognition techniques. Users may enroll for use of a user-recognition system that utilizes various biometric-based recognition techniques so users may be identified without having to carry or use traditional forms of identification, such as showing an ID card or accessing their personal phone. The user-recognition system may recognize, or identify, enrolled users for various purposes, such as for automating traditional checkout experiences in a materials handling facility (or "facility") by charging appropriate user accounts with purchases of items selected by enrolled users in the facility.

In one illustrative example, the systems and techniques are used to recognize or identify users within a materials handling facility, which may include, or have access to, an inventory-management system. The inventory-management system may be configured to maintain information about items, users, condition of the facility, and so forth. For example, the inventory-management system may maintain data indicative of a result of different events that occur within the facility, such as what items a particular user has picked and/or returned, location of the particular user, and so forth.

Operation of the inventory-management system may be supported by sensor data acquired by one or more sensors. The sensor data may include image data acquired by imaging devices such as cameras, information acquired from radio frequency tags, weight sensors, and so forth. For example, the inventory-management system may automatically identify an item removed from an inventory location as well as a user that removed the item. In response, the inventory-management system may automatically update a virtual shopping cart of that particular user.

Traditionally, when a user has finished their shopping session, the user would have to pay for their items by having a cashier scan their items, or by using dedicated self-checkout stands. The techniques described herein reduce friction in the traditional checkout experience by recognizing or identifying a user enrolled for use of the user-recognition system, and charging a user account for that user with the cost of the items included in their virtual shopping cart. According to the techniques described herein, a user enrolled for use of the user-recognition system may need only look at a camera of a user-recognition device located in the facility, and speak a predefined speech utterance (e.g., their name), in order to be identified by the user-recognition system.

To utilize the user-recognition system, a user may request to be enrolled by interacting with a client device of the user, a user-recognition device positioned in a facility, or the like. For example, the user may select an enroll option on a display of a computing device, may issue a voice command requesting to be enrolled to the computing device, may insert a user ID card into the computing device, and/or may simply present their face before the computing device to prompt a dialogue with the device.

Regardless of the manner in which the user requests to enroll, upon doing so the computing device may, with user permission and/or user request, begin collecting various types of biometric data and/or other data for the user. For example, the computing device may include one or more imaging sensors (e.g., a camera) that begins capturing image data (e.g., an individual image, a sequence of images, a video, etc.) of the user. The computing device may request that the user move their face and head to different angles as the device captures the image data, and may also capture image data under different lighting conditions (e.g., no flash, flash, etc.), to generate image data representing the user under different environmental conditions.

Further, the computing device may request (e.g., output dialog using a speaker, present text on a display, etc.) that the user begin speaking a certain speech utterance, such as the user's name, and begin to capture audio data using one or more microphones included in the computing device. The computing device may continue to capture the image data and audio data for a predefined period of time, or until the user has finished speaking.

In some examples, the user may already have an account registered with the inventory-management system to pay for items selected during a shopping session. In such examples, the user-recognition device may determine a user account with which the user is registered in various ways, such as by requesting that the user insert a personal ID card (e.g., driver's license), scan a barcode that may be presented on a display of a phone of the user, and so forth.

Once the computing device has obtained the image data representing the face of the user, and the audio data representing the speech utterance of the user (e.g., the name of the user), the device may utilize this data to enroll the user for use of the user-recognition system. In some examples, the user-recognition system may be implemented according to a split architecture where a user-recognition device at a facility performs identification techniques for identifying user, and more intensive and/or advanced processing may be performed using a backend, server-based implementation. For example, the user-recognition system may include one or more network-based computing devices positioned at a separate location in the facility, and/or at a remote, cloud-based location. The network-based devices may include various components for implementing the user-recognition system.

In such examples, the computing device that captured the image and audio data of the user may send that data to the network-based devices in order to enroll the user for the user-recognition system. The network-based devices of the user-recognition system may perform various processing techniques on the image data and audio data such that the user-recognition system is able to identify the user from subsequently received image data and audio data.

The user-recognition system may analyze the image data to determine various features of the user. For example, the user-recognition system may extract and/or generate, based on the image data, facial-feature data representing the face of the user. The user-recognition system may utilize any type of processing techniques to extract the facial-feature data, and may represent the face of the user depicted in the image data using various types of data structures, such as feature vectors. In some examples, the user-recognition system may include one or more trained models (e.g., machine-learning models) that have been trained to receive image data of a user as input, and output feature vectors representing a face of the user.

Further, the trained model(s) of the user-recognition system may additionally receive, as inputs, image data representing a sequence of images, and/or video, depicting the user speaking the speech utterance, and audio data representing the speech utterance. The trained model(s) may be trained to extract and output a lip-movement/utterance feature vector that represents characteristics and/or features of the user's lip movement that are synchronized with audio characteristics of the speech utterance. In this way, the user-recognition system is able to identify lip-movement/utterance feature vectors for a user which represents how the user's lips move when speaking a speech utterance, and also represents how the speech utterance sounds when the particular user speaks the speech utterance. Generally, the trained model(s) may comprise any type of models, such as machine-learning models (e.g., artificial neural networks, convolution neural networks (CNNs), classifiers, random-forest models, etc.) that may be trained to identify a face of a user, and/or lip movement and corresponding audio characteristics for a speech utterance of the user.

Upon obtaining the feature data that represents the face of the user, and feature data that represents the lip movement and audio characteristics of the user when speaking the speech utterance, the user-recognition system may store the feature data in an enrollment database, and associate the feature data with a user profile for that specific user. In this way, when subsequent image data and audio data are received for a user that is speaking a speech utterance, the feature data stored in the enrollment database may be compared with the feature data extracted from the subsequent image data and audio data to identify a user profile for the user represented in the subsequent image data and audio data.

In some examples, the user-recognition system may process the audio data to determine various features related to the speech utterance of the user. For instance, the user-recognition system may transcribe the audio data into text data which represents words of the speech utterance (e.g., the name of the user), such as by using automatic speech processing (ASR). The user-recognition system may then store an association, or mapping, between the text data and the user profile. The user-recognition system may also compare the text data with subsequent text data associated with a subsequent speech utterance to help determine a user profile for a user that spoke the subsequent speech utterance. Accordingly, the user-recognition system may determine characteristics of how the user speaks a speech utterance that may be unique to that user, and what speech utterance the user speaks, to help to identify a user profile for an enrolled user.

In this way, the user may be enrolled for use of the user-recognition system such that, after completing subsequent shopping sessions, the user may check-in at a facility or checkout of their shopping session by looking into a camera of a user-recognition device and saying their name to allow the user-recognition system to automatically recognize the user. The user-recognition device may detect the presence of the user (e.g., detect a face, detect the speech utterance, detect a touch input via a touch display, etc.), and begin streaming image data and audio data to the backend devices of the user-recognition system. The backend devices of the user-recognition system may then utilize the trained model(s) to extract feature data, and compare that feature data to stored feature data for user profiles of enrolled users.

In some examples, the user-recognition system may determine the user profile for a user using only facial-feature data that represents the face of the user. However, in various examples the user-recognition system may be configured to identify multiple user profiles (e.g., a group of top "N" candidates) as being associated with respective facial features that correspond to the facial features of a specific user. For instance, the user-recognition system may match the facial-feature data for a received image of a user to multiple user profiles for enrolled users that have more than a threshold amount of similarity or correspondence (e.g., similar facial-feature data). In such examples, the user-recognition system may use one or more additional modalities to verify the identity of the user. For example, the user-recognition system may perform speech recognition on the audio data to determine text data that represents the name of the user. The text data may then be compared to text data associated with each of the multiple user accounts to verify/identify the appropriate user. Additionally, or alternatively, the user-recognition system may verify/identify the identity of the user by determining lip-movement/utterance feature data that represents the lip movement and audio characteristics of the user when speaking the speech utterance, and comparing that lip-movement/utterance feature data with respective lip-movement/utterance feature data for user profiles of enrolled users. Thus, in some examples the facial-feature data representing the face of a user may be utilized by the user-recognition system to identify one or more user accounts with corresponding facial-feature data, and one or more additional modalities may be utilized to verify which of the multiple user accounts belongs to the user shown in the image data.

To maintain an accurate and/or current representation of the face of the user, the user-recognition system may update the facial-feature data using image data, such as recently obtained image data, of the user. As the user continues to utilize the user-recognition system, facial features of the user may change over time. For instance, various users may grow beards, change their hairstyles, begin wearing glasses or hats, and/or undergo other physical changes to their face. Accordingly, the user-recognition system may determine to update the facial-feature data representing the users to maintain an accurate representation of the users. In some instances, the user-recognition system may collect and store image data for each occurrence of the user utilizing the user-recognition system, and periodically (e.g., every three months, every six months, etc.) utilize at least a portion of those images to update the facial-feature data stored in the enrollment database for the user. In some examples, the user-recognition system may update the facial-feature data upon detecting a significant change in the facial features of the user, such as the user growing a beard or changing their hairstyle. By updating the facial-feature data using image data that is more recently obtained, the user-recognition system may maintain a more accurate representation of the enrolled users in order to more accurately identify enrolled users over time.

Furthermore, and as described above, a user may initially enroll with the user-recognition system using a first computing device, and may thereafter be identified by the user-recognition system using a second or additional computing devices. For example, a user may use a client device (e.g., a mobile phone, tablet, laptop, voice-controlled device, etc.) to enroll with the system, and may thereafter be recognized via a user-recognition device located at a facility. In another example, the user may be enrolled with the user-recognition system using a first user-recognition device at a first facility, and may thereafter be recognized via a second user-recognition device, at the same or a different, second facility.

In these instances, one or more of the sensors of the enrollment device may differ from one or more of the sensors of the user-recognition device. For example, a camera and/or microphone of the enrollment device may have different characteristics, specifications, or the like than those of the user-recognition device. Described herein, therefore, are techniques for taking into account these differences between the enrollment-device sensor(s) and the recognition device sensor(s) for purposes of increasing the accuracy of user recognition.

In some instances, for example, a microphone of the enrollment device may differ from a microphone of the user-recognition device. The techniques described below may thus take these differences into account such that a first audio signal based on audio captured at the time of enrollment more closely matches a second audio signal based on audio captured at the time of recognition. For instance, the techniques may determine a relative transfer function to apply to the first audio signal and/or the second audio signal prior to comparing these signals. Thereafter, the techniques may apply the relative transfer function to one or more of the audio signals, prior to making a comparison of audio signals for recognition purposes. In addition, or in the alternative, the techniques may apply the relative transfer functions to audio feature data generated from the audio signals. As used here, storage of or operation upon "audio data" may include storing or operating upon raw audio signals, filtered audio signals, feature data generated from audio signals, and/or the like.

To provide an example, a particular user may enroll in the user-recognition system by stating a first instance of a particular utterance to a first device having a first type of microphone. For instance, the user may state his or her name or any other utterance as specified by the first device, which may capture sound associated with the utterance and generate a corresponding first audio signal. Further, a camera of a first device, or a camera of a second device proximate the first device, may capture image of data of the user, such as an image of a face of the user, video of the user as the user speaks the first instance of the utterance, or the like. The first device (or another device) may then send some or all of this image data and audio data to the user-recognition system, which may store the received data for later recognition purposes. In addition, the first device may send information identifying the first device, which may be used to identify the type of microphone of the first microphone. For example, the first device may send its brand, model, etc., may send an indication of the brand, model, etc. of the microphone, or may send any other information for identifying the microphone (or type of microphone) that generated the first audio signal.

The user-recognition system may use this identifying information to identify the type of microphone used by the second device. This information, in turn, may be used for determining a relative transfer function to apply to the first audio signal, or first audio feature data generated from the first audio signal, prior to comparing it to a second audio signal, or second audio feature data generated from the second audio signal.

Sometime after the user has enrolled in the user-recognition system, the user may visit a facility having a user-recognition device. The user-recognition device may instruct (e.g., via a display, audibly, etc.) the user to state a second instance of the utterance, such as the name of the user. A microphone of the user-recognition device, meanwhile, may generate an audio signal corresponding to the sound of the second utterance. A camera of the user-recognition device (or another proximate device) may generate image data of the user as the user speaks the second instance of the utterance.

After generating this image data and audio data, the user-recognition device may send some or all of this data to the user-recognition system. The user-recognition system may perform automatic speech recognition (ASR) on the received audio signal to identify the utterance. The user-recognition system may also use the image data to identify candidate users from those users enrolled with the system. For instance, the user-recognition system may generate features of the received image data and compare these features to features from image data associated with different user profiles at the system. The user-recognition system may then use this information, and/or the text data, to identify a list of N candidate user profiles that may correspond to the user currently at the facility.

After identifying these candidate profiles, the user-recognition system may then compare the audio signal (or features thereof) received from the user-recognition device to respective audio signals (or features thereof) associated with the candidate profiles. The user-recognition system may then determine that the candidate user profile associated with the audio signal having the highest level of similarity to that of the received audio signal corresponds to the user currently at the facility.

Prior to comparing these audio signals (or features thereof), however, the user-recognition system may apply the appropriate respective transfer function to each of the previously stored audio signals. That is, the user-recognition system may determine: (1) the type of microphone used in the user-recognition device that provided the second audio signal, and (2) the relative transfer function that, when applied to a previously stored audio signal generated by a particular microphone, minimizes the differences between the audio signals that are due to acoustic characteristics of the microphones. After determining the appropriate relative transfer function, the user-recognition system may apply the relative transfer function to the previously stored audio signal (or features thereof).

Stated otherwise, the user-recognition system may apply a relative transfer function, which represents an acoustic relationship between the microphone that captured the enrollment audio signal and the microphone of the user-recognition device, to the previously stored audio signal to minimize the microphone-based differences of these signals and, thus, increase user-recognition accuracy.

In the example from above, for instance, the user-recognition system may determine the relative transfer function to apply when attempting to lessen differences between audio signals generated by the first microphone of the first device and audio signals generated by the microphone of the user-recognition device. After applying this relative transfer function to the first audio signal, thereby generating a modified audio signal, the user-recognition system may compare the modified audio signal to the audio signal received from the user-recognition device at the facility. Further, the user-recognition device may apply different relative transfer functions to different audio signals associated with the candidate user profiles, based on the microphone types of the devices that initially captured these audio signals during the enrollment process.

As noted above, by accounting for differences in audio signals based on acoustic or response differences between microphones, the techniques described herein increase the accuracy of the resulting identification/recognition system.

In some instances, the user-recognition system may generate a relative-transfer-function database that includes a data structure associating relative transfer functions to apply to different microphone pairs. That is, the relative-transfer-function database may store an indication of a unique transfer function to apply before comparing an audio signal (or features thereof) generated to a first particular microphone to an audio signal generated (or features thereof) by a second particular microphone. In some instances, this database stores associations between microphones, while in other instances the database stores associations between devices (based on the microphones housed therein). Thus, the user-recognition system may access this database and implement the appropriate relative transfer function prior to comparing two audio signals.

Further, while the above example describes applying a relative transfer function to each candidate enrollment audio signal, in other instances the user-recognition system may additionally or alternatively apply a relative transfer function to the audio signal received at the user-recognition system. That is, the user-recognition system may store, and apply, relative transfer functions that map audio signals received from user-recognition device(s) to enrollment audio signals.

Although the techniques are primarily described below with reference to identifying users for the purpose of identifying a user account to charge for items selected from a materials handling facility, the techniques are equally applicable to any industry in which user recognition may be helpful. For instance, the user-recognition system may be implemented for security purposes such as accessing locked locations, accessing user accounts via computing devices, accessing bank accounts, and so forth. Further, while certain types of machine-learning models and algorithms are discussed herein, the techniques may be employed using other types of technologies and are generally scalable to different computer-based implementations.

The following description describes use of the techniques within a materials handling facility. The facility described herein may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1A illustrates an example architecture 100 in which a user 106 may enroll with a user-recognition system using a first device 104(1) and later be recognized by the user-recognition system based on data generated by a second device 104(2). While FIG. 1A illustrates that the user 106 may enroll using a mobile device of the user 106, it is to be appreciated that the user may enroll using any client computing device of the user 106 and/or using any other device, such as the second computing device 104(2) located at a materials handling facility 102.

In either instance, the first device 104(1) generates image data depicting the user 106 speaking a speech utterance, generates audio data representing the speech utterance, and sends the image data and audio data to one or more backend servers 108 to be used to enroll the user for use of the user-recognition system. Generally, the user-recognition system may include the user-recognition device 104(2) and/or the server(s) 108. Further, while the following description discusses certain components residing on the devices 104(1)-(2) and the servers 108, it is to be appreciated that this functionality may reside at different locations in other instances.

In some instances, some or all of the user-recognition system resides remotely from the materials handling facility 102, while in other instances some or all of the user-recognition system resides within or proximate to the materials handling facility 102. As FIG. 1A depicts, the user 106 may engage in a shopping session in the materials handling facility 102 after being recognized via the second device 104(2). For instance, the user 106 may have selected an item 110 from an inventory location 112 (e.g., shelf, aisle, etc.) and placed the item 110 in a tote 114 (e.g., shopping cart). The inventory location 112 may house one or more different types of items 110 and the user 106 may pick (i.e., take) one of these items 110.

As illustrated, the materials handling facility 102 (or "facility") may include one or more sensors, such as the illustrated imaging sensors 116, and/or an array of other sensors located on or near the inventory location(s) 112. In this example, the imaging sensor(s) 116 are configured to capture video data within the facility 102 for use in determining results associated with events, such as the picking of the item 110 by the user 106. While FIG. 1A illustrates various example sensors, the sensors in the facility 102 may comprise any other type of sensor, such as weight sensors (e.g., load cells), microphones, and/or the like, as described in detail below. As described in more detail with respect to FIGS. 10 and 11, the facility 102 may be monitored and/or otherwise associated with an inventory-management system configured to determine events in the facility 102 associated with the user 106, such as taking items 110 that the user 106 would like to purchase. The inventory-management system may track the items 110 selected by the user 106, and maintain a virtual shopping cart which includes all of the items 110 taken by the user 106. Thus, when a user 106 would like to leave the facility 102 with the items 110 they have taken, the inventory-management system may charge a user account associated with the user 106 for the cost of the items 110 that were taken.

In order to enroll with the user-recognition system, the user 106 may operate the first device 104(1), which may request that the user 106 state a first instance of a predefined utterance, such as a name of the user. While the user states the utterance, one or more microphones of the device 104(1) may generate a corresponding audio signal 120(1). In some instances, one or more cameras of the device 104(1) may also generate image data associated with the user 106, such as video data of the user 106 while the user 106 speaks the utterance. As illustrated, the first device (or "enrollment device") 104(1) may send the audio data 120(1), potentially along with the image/video data, to the servers 108. In addition, the device 104(1) may send identifying information of the device 104(1), such as a make, model, brand, etc. of the device, which the user-recognition system may use to determine the identity and/or type of microphone used by the device 104(1).

Upon receiving the audio signal 120(1), the servers 108 may store the signal. In addition, the servers 108 may use the identifying information associated with the device 104(1) to determine a relative transfer function to apply to the audio signal prior to comparing the audio signal to another audio signal received from a user-recognition device 104(2), as described below. It is to be appreciated, however, that the servers 108 may alternatively determine this relative transfer function after determining that the audio signal 120(1) is to be compared to another audio signal generated by a different device, such as the device 104(1).

As illustrated, sometime after enrollment the user 106 may enter the materials handling facility 102. Upon entering and/or exiting the facility 102, the user 106 may interact with the user-recognition device 104(2) for the purpose of being identify by the user-recognition system. In some instances, the user-recognition device 104(2) instructs the user to state a particular utterance, such as her name, while one or more microphones of the device 104(2) generate a corresponding audio signal 120(2) and one or more cameras of the device 104(2) (and/or another device) generate image data, such as video data of the user speaking the utterance. The user-recognition device 104(2) may thereafter send the audio signal 120(2), potentially along with the generated image data, to the servers 108. In some instances, the user-recognition device 104(2) may also send identifying information for identifying the device 104(2), for identifying the type of microphone used in the device 104(2). In other instances, the device 104(2) may send identifying information for the microphone(s) directly to the servers 108.

Upon receiving the data (e.g., audio and/or image) from the user-recognition device 104(2), the servers 108 may attempt to recognize the user 106 at the facility 102. For example, the servers 108 may compare feature data from image data received from the device 104(2) to feature data associated with previously received image data, such as image data received from the device 104(1). The servers 108 may then determine a list of N user profiles for which to compare the received audio signal 120(2) to enrollment audio signals associated with the respective N user profile.

In the illustrated example, the servers 108 may determine that the audio signal 120(2) is to be compared to the audio signal 120(1). However, prior to comparing these signals, the servers 108 may determine the appropriate transfer function to apply to one or both of these audio signals to account for an acoustic relationship between the different microphones. For example, the acoustic relationship may represent how these microphones have different responses from one another when generating corresponding audio signals. By taking these differences into account, the identification/recognition accuracy of the user-recognition system may be increased.

In this example, the servers 108 may access a relative-transfer-function databased and may determine that a particular relative transfer function is to be applied the first audio signal 120(1) to generate a third audio signal prior to comparison with the second audio signal 120(2). After applying the relative transfer function to generate the third audio signal 120(3), the third audio signal 120(3) may be compared to the second audio signal 120(2) to determine whether they correspond (e.g., have a similarity greater than a threshold) to one another. In the instant example, the servers 108 may determine that the second audio signal corresponds to the third audio signal and, thus, may determine that the user 106 at the materials handling facility 102 corresponds to a user profile associated with the audio signal 120(1). Thus, items acquired by the user 106 at the facility 102 may be purchased by charging a prestored payment instrument associated with the identified user profile for the cost of the selected items.

FIG. 1B illustrates example components of the first device 104(1), with which a user enrolls with the user-recognition system, and the second device 104(2), which the system later uses for recognizing the user. As illustrated, for example, the first device 104(1) may comprise one or more processors 122(1) configured to power components of the device 104(1), and may further include memory 124(1) which stores components that are at least partially executable by the processor(s) 122(1), as well as other data. The memory 124(1) may include one or more applications 130, such as an enrollment application provided by the user-recognition system for enabling the user 106 to enroll with the system. The memory 124(1) may also store image data 140(1) and audio data 142(1), as described below.

The device 104(1) may further include one or more imaging devices 132(1), one or more input/output devices 134(1), one or more microphones 144(1), and one or more communication interfaces 150(1).

In some instances, the user 106 may use the enrollment application 130 to request to enroll with the user-recognition system. After receiving this request, the application may instruct the imaging device 132(1) (e.g., a camera) to begin generating image data 140(1).

This image data may comprise one or more pictures, a sequence of consecutive images, video data, and/or the like. In some instances, the image data 140(1) may represent the face of the user 106. Additionally, the enrollment application 130 may instruct the microphone(s) 144(1) to begin generating audio data 142(1). The microphones 144(1) may be configured to acquire information indicative of sound, such as a speech utterance of the user 106 and generate audio data 142(1). Prior to generating the audio data 142(1), the enrollment application 130 may have prompted or requested that the user 106 speak a predefined speech utterance that is to be associated with the user requesting to checkout after shopping sessions or check-in upon entering the facility. Examples of the speech utterance may simply include the user 106 speaking their name, using a predefined phrase such as "please check out my items," and/or the like.

Once the enrollment application 130 has obtained the image data 140(1) representing the user 106 as they are speaking the speech utterance, and the audio data 142(1) representing the speech utterance, device 104 may (1) send the audio data 142(1) and the image data 140(1) to the server(s) 108. For instance, the device 104(1) may send the image data 140(1) and audio data 142(2) over one or more networks using the one or more communication interfaces 150(1). In some instances, the device 104(1) may also send information for identifying the device 104(1) and/or the microphone(s) 144(1) of the device 104(1).

The network(s) may include private networks such as an institutional or personal intranet, public networks such as the Internet, or a combination thereof. The network(s) may utilize wired technologies (e.g., wires, fiber optic cable, and so forth), wireless technologies (e.g., radio frequency, infrared, acoustic, optical, and so forth), or other connection technologies. The network(s) 148 is representative of any type of communication network, including one or more of data networks or voice networks. The network(s) may be implemented using wired infrastructure (e.g., copper cable, fiber optic cable, and so forth), a wireless infrastructure (e.g., cellular, microwave, satellite, etc.), or other connection technologies.

The communication interface(s) 150(1), meanwhile, may include devices configured to couple to personal area networks (PANs), wired and wireless local area networks (LANs), wired and wireless wide area networks (WANs), and so forth. For example, the communication interfaces 308 may include devices compatible with Ethernet, Wi-Fi™, and so forth. In some examples, the communication interface(s) 150(1) may encode the image data 140(1) and/or audio data 142(1) prior to sending over the network(s) according to the type of protocol or standard being used.

In this way, the enrollment device 104(1) may obtain data, such as audio data 142(1) and image data 140(1), that may be utilized by the server(s) 108 to enroll the user 106 for use in the user-recognition system. As noted above, in some examples, the user-recognition device 104 may perform some or all of the operations described below as being performed by the server(s) 108. While the servers 108 are illustrated as being in a location outside of the facility 102, in other implementations, at least a portion of the servers 108 may be located at the facility 102.

After the servers have received the image data 140(1) and the audio data 142(1) and stored them in association with a profile of the user 106, the user 106 may thereafter request to be recognized when at the facility 102. As such, the user 106 may interact with the user-recognition device 104(2). The user-recognition device 104(2) may comprise one or more processors 122(2) configured to power components of the device 104(2), and may further include memory 124(2) which stores components that are at least partially executable by the processor(s) 122(2), as well as other data. The memory 124(2) may include a presence-detection component 126, to detect the presence of a user 106 for enrollment or recognition purposes, and a front-end enrollment component 128, configured to perform various operations for enrolling the user 106 for use of the user-recognition system. That is, the front-end enrollment component 128 may function similar to the enrollment application 130, although on the user-recognition device 104(2) present at the facility 102 rather than on the device 104(1) of the user 106. The memory 124(2) may also store image data 140(2) and audio data 142(2), as described below. The device 104(2) may further include one or more imaging devices 132(2), one or more input/output devices 134(2), one or more microphones 144(2), and one or more communication interfaces 150(2).

In some instances, upon the presence-detection component 126 identifying the presence of a user (e.g., via motion, the user operating the display, etc.), the component 126 may request that the user state a predefined utterance, such as the name of the user. As the user does so, the component 126 may instruct the microphone(s) 144(2) to generate an audio signal and the imaging device(s) 132(2) to generate image data while the user speaks the utterance. The component 126 may then send this information to the servers 108 for identifying the user.

Figure 2:
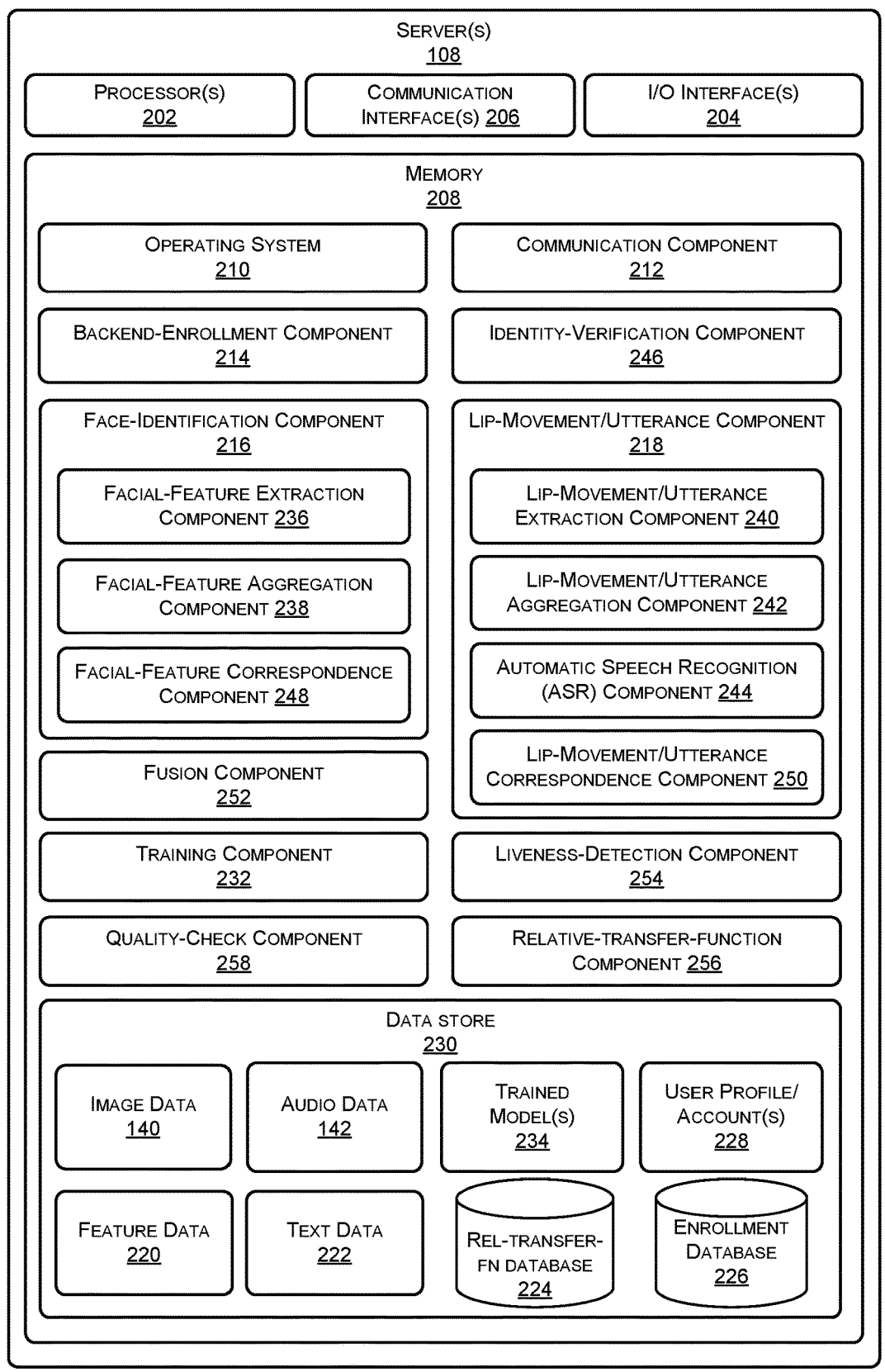
FIG. 2 illustrates example components of one or more servers configured to support at least a portion of the functionality of a user-recognition system. In some instances, the one or more servers include a relative-transfer-function component for applying a relative transfer function to an audio signal associated with an utterance of a user provided at a time of enrollment so as to remove differences between a microphone of an enrollment device and a microphone of a device at which the user is being recognized.

FIG. 2 illustrates example components of one or more servers 108 configured to support at least a portion of the functionality of a user-recognition system. In some examples, the user-recognition system described herein may be supported entirely, or at least partially, by the user-recognition device 104(1) in conjunction with the servers 108. The server(s) 108 may be physically present at the facility 102, may be at a remote location accessible by the network, or a combination of both. The server(s) 108 does not require end-user knowledge of the physical location and configuration of the system that delivers the services. Common expressions associated with the server(s) 108 may include "on-demand computing," "software as a service (SaaS)," "cloud services," "data centers," and so forth. Services provided by the server(s) 108 may be distributed across one or more physical or virtual devices.

The server(s) 108 may include one or more hardware processors 202 (processors) configured to execute one or more stored instructions. The processors 202 may comprise one or more cores. The server(s) 108 may include one or more input/output (I/O) interface(s) 204 to allow the processor 202 or other portions of the server(s) 108 to communicate with other devices. The I/O interfaces 204 may comprise Inter-Integrated Circuit (I2C), Serial Peripheral Interface bus (SPI), Universal Serial Bus (USB) as promulgated by the USB Implementers Forum, RS-232, and so forth.

The server(s) 108 may also include one or more communication interfaces 206. The communication interfaces 206 are configured to provide communications between the server(s) 108 and other devices, such as the enrollment device 104(1), the user-recognition device 104(2), the interface devices, routers, and so forth. The communication interfaces 206 may include devices configured to couple to personal area networks (PANs), wired and wireless local area networks (LANs), wired and wireless wide area networks (WANs), and so forth. For example, the communication interfaces 308 may include devices compatible with Ethernet, Wi-Fi™, and so forth.

The server(s) 108 may also include one or more busses or other internal communications hardware or software that allow for the transfer of data between the various modules and components of the server(s) 108.

As shown in FIG. 2, the server(s) 108 includes one or more memories 208. The memory 208 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 208 provides storage of computer-readable instructions, data structures, program modules, and other data for the operation of the server(s) 108. A few example functional modules are shown stored in the memory 208, although the same functionality may alternatively be implemented in hardware, firmware, or as a system on a chip (SOC).

The memory 208 may include at least one operating system (OS) 210. The OS 210 is configured to manage hardware resource devices such as the I/O interfaces 204, I/O devices, the communication interfaces 206, and provide various services to applications or modules executing on the processors 202. The OS 210 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Wash., USA; and so forth.

One or more of the following components may also be stored in the memory 208. These modules may be executed as foreground applications, background tasks, daemons, and so forth.

A communication component 212 may be configured to establish communications with one or more of the imaging sensors 116, enrollment devices 104(1), user-recognition devices 104, other server(s) 108, or other devices. The communications may be authenticated, encrypted, and so forth.

A backend-enrollment component 214 may be configured to perform various operations for enrolling a user 106 for use of the user-recognition system. For instance, the backend-enrollment component 214 may perform various operations, and/or cause other components to perform various operations, to enroll users 106 in the user-recognition system. In some instance, the backend-enrollment component 214 may at least partly control a face-identification component 216 that performs operations for analyzing image data 140(1), (2), etc. (collectively, "image data 140") depicting a face of the user 106. Additionally, the backend-enrollment component 214 may control operations of a lip-movement/utterance component 218, which performs various operations for analyzing image data 140 representing lip movement as a user 106 issues a speech utterance, as well as audio data 142(1), (2), etc. (collectively, "audio data 142") representing the speech utterance of the user 106. In some examples, the backend-enrollment component 214 may cause the face-identification component 216 to analyze the image data 140 and extract features which represent a face of the user 106, such as facial-feature data 220. Further, the backend-enrollment component 214 may cause the lip-movement/utterance component 218 to analyze the image data 140 and the audio data 142 to generate lip-movement/utterance feature data 220 that represents the lip movement features of the user 106 and audio characteristics of the speech utterance when the user 106 speaks the speech utterance. Additionally, the backend-enrollment component 214 may cause the lip-movement/utterance component 218 to perform speech recognition, or transcription, on the audio data 142 to generate text data 222, which includes textual characters that represent or correspond to words of the speech utterance (e.g., a name of the user 106).

After obtaining, determining, and/or generating the feature data 220 (e.g., facial feature data, lip-movement/utterance feature data, etc.), and the text data 222, the backend-enrollment component 214 may enroll the user 106 in an enrollment database 226 which indicates that the user 106 is enrolled for use of the user-recognition system. In some examples, the backend-enrollment component 214 may associate, or map, the various data to a user profile/account 228 that is associated with the user 106. For example, the backend-enrollment component 214 may map, for each enrolled user 106, respective facial-feature data 220, lip-movement/utterance feature data 220, and/or text data 222 to corresponding user profiles 228 in the enrollment database 226. Thus, the enrollment database 226 may store indications of user profiles 228, as well as the data for users 106 associated with each of the user profiles 228. When a user 106 is enrolled for use of the user-recognition system, the backend-enrollment component 214 may map, or store an association, between the user's 106 feature data 220 (e.g., facial-feature data, lip-movement feature data, utterance feature data, etc.) and text data 222 with the user profile 228 for that user 106. Further, the user profile/profile 228 may include various information for the user 106, such as payment information to perform transactions for items 110 selected by the user 106 from the facility 102. The various types of data discussed herein may be stored in a data store 230 in the memory 208 of the server(s) 108, as illustrated in FIG. 2.

Further, the backend-enrollment component 214 may cause a training component 232 to train one or more trained models 234. The training component 232 may utilize the facial-feature data 220 and the lip movement feature data 220 to train the trained model(s) 234 to perform various operations for extracting and/or generating, from the image data 140, the facial-feature data. Further, the training component 232 may train the trained model(s) to perform various operations for extracting and/or generate, from the image data 140 and/or audio data 142, the lip-movement/utterance feature data. The trained model(s) 234 may comprise any type of model, such as machine-learning models, including but not limited to artificial neural networks, classifiers, decision trees, support vector machines, Bayesian networks, and so forth.

As a specific example, the trained model(s) 234 may include or comprise one or more convolution neural networks (CNNs), recursive neural networks, and/or any other artificial networks, that are trained to analyze image data 140 received as input, and extract, determine, identify, generate, etc., facial-feature data 220 representing a face of the user 106. Further, the trained model(s) 234 may include or comprise any type of neural networks that are trained to analyze image data 140 and audio data 142 as input, and extract, determine, identify, generate, etc., lip-movement/utterance feature data 220 representing a face of the user 106 lip movement and audio characteristics of the user 106 when speaking the speech utterance. Generally, the trained model(s) 234 may be trained using networks, such as embedding networks, that receive two types of data: (1) inter-class variety/variability of image data 140 and audio data 142 (e.g., variety of data across different users 106), and (2) intra-class variety/variability of image data 140 and audio data 142 (e.g., variety of data for the same user 106, such as images of the user 106 at different orientations, with different hairstyles, with and without beards, different lighting, etc.). The trained model(s) 234 may be configured to receive image data 140 as an input, such as one or more images depicting a face of the user 106, and transform the image data 140 into facial-feature data 220 according to the type of network. As a specific example, the facial-feature data 220 may comprise a 128-dimension feature vector representing the face of the user 106. Similarly, the trained model(s) 234 may be configured to receive image data 140 and audio data 142 as inputs, and transform the data into lip-movement/utterance feature data 220 as outputs, such as a 3D volumetric model, a 128-dimension feature vector, and/or any other representation of the lip movement and audio characteristics of the user 106 when speaking the speech utterance.

In examples where the trained model(s) 234 include one or more CNNs, various functions may be utilized to transform the image data 140 into a metric space, such as a triplet loss function. Thus, the training component 232 may train the CNNs of the trained model(s) 234 using various functions, such as a triplet loss function, to extract, identity, or otherwise determine facial-feature data 220 and lip-movement/utterance feature data 220 from input image data 140 and audio data 142. Once in the metric space, extracted feature data may be compared, or matched, by computing a distance between the extracted feature data and feature data stored in the enrollment database 226. For instance, when feature data is extracted from the image data 140 and audio data 142 into facial-feature data 220 and lip-movement/utterance feature data 220 by the trained model(s) 234, the extracted facial-feature data 220 and lip-movement/utterance feature data 220 may then be compared to stored data in the enrollment database 226 to identify a user profile for the user 106 represented in the input image data 140. For instance, the extracted facial-feature data 220 and lip-movement/utterance feature data 220 may comprise vectors that are compared with stored vectors in the enrollment database 226 to identify which stored vectors have the smallest "distance" between the extracted feature data. The smaller the distance, the closer the strength of correspondence between the extracted feature data and the stored feature data representing users 106 that are enrolled for use of the user-recognition system. In some examples, other calculations may be performed, such as finding a cosine of an angle between two vectors, depending on the network utilized by the trained model(s) 234. However, any type of models may be utilized for the trained model(s) 234.

The face-identification component 216 may include various sub-components for performing various operations. For instance, the face-identification component 216 may include a facial-feature extraction component 236 to extract feature data from the image data 140. The facial-feature extraction component 236 may utilize the trained model(s) 234, and/or include algorithms, to perform any type of feature extraction method, or embedding, to analyze the image data 140 and extract the facial-feature data 220. For instance, the facial-feature extraction component 236 may utilize state of the art models, such as clustering, artificial neural networks, scale-invariant feature transform, edge detection, or any other type of extraction or embedding technology, to extract facial-feature data 220 from the image data 140.

The face-identification component 216 may further include a facial-feature aggregation component 238 configured to aggregate feature data for a user 106. For instance, the facial-feature aggregation component 238 may combine facial-feature data 220 that has been extracted from a group of images depicting the user 106, such as by averaging the features in the facial-feature data 220.

The lip-movement/utterance component 218 may further include sub components to perform various operations, such as a lip-movement/utterance extraction component 240 and a lip-movement/utterance aggregation component 242. Generally, the lip-movement/utterance extraction component 240 may analyze the image data 140 and the audio data 142 in order to extract features from the image data 140 and audio data 142 that depict lip movement of the user 106 when the user 106 is speaking the speech utterance, as well as corresponding audio characteristics of the speech utterance represented in the audio data 142. For example, the lip-movement/utterance extraction component 240 may utilize one or more trained model(s) 234 to analyze a sequence of images, and/or video data, to identify frames which illustrate different lip positions of the user 106 as they speak the speech utterance. The lip-movement/utterance extraction component 240 may utilize the trained model(s) 234 to extract features from the images in the sequence and construct feature data which represents the lip movement of the user 106 as they issue the speech utterance. Further, the lip-movement/utterance extraction component 240 may utilize the trained model(s) 234 to extract audio characteristics of the speech utterance from the audio data 142, such as spacing between sounds that represent letters or words, signal-energy measurements for frequency bands that make-up the speech utterance represented in the audio data, and/or any other type of audio characteristic. For instance, the lip-movement/utterance extraction component 240 may utilize the trained model(s) 234 to identify lip movement from the image data 140, as well as the speech utterance from the audio data 142, corresponding to a period of time when the user 106 spoke the speech utterance (e.g., a two second window when the user 106 spoke their name). As a specific example, the image data 140 may be captured at roughly 30 frames per second, resulting in roughly 60 frames over a 2 second period of time during which the user 106 is moving their lips when issuing the speech utterance. The trained model(s) 234 may be configured to identify the presence of the speech utterance in the audio data 142, and portion out the speech utterance into 60 corresponding portions that match with the 60 frames from the image data 140. The trained model(s) 234 may create a feature vector which represents lip movement feature data for each of the 60 frames, and corresponding audio characteristics for the 60 portions of the audio data 142 representing the speech utterance. In this way, the trained model(s) 234 may be utilized by the lip-movement/utterance extraction component 240 to analyze the image data 140 and audio data 142, and output lip-movement/utterance feature data 220.

Further, the lip-movement/utterance extraction component 218 may include a signal-energy component that may be configured to identify the signal-energy data from the audio data 142 that represents the speech utterance of the user 106. In some examples, the signal-energy component may analyze the audio data 142 to identify frequency components by representing the audio data 142 in the frequency domain using a transform, such as a Fourier Transform (e.g., Fast Fourier Transform, discrete Fourier Transforms, etc.), Hartley Transform, Fourier Series, Laplace transforms, Z transforms, etc. The signal-energy component may identify a portion of the audio data 142 that includes or represents the speech utterance based on ranges of signal-energy measurements that correspond to frequency bands for user's 106 speech utterances 120. For instance, the lip-movement/utterance extraction component 240 may split the audio data 142 (e.g., audio signals) into frequency ranges, frequency bands, or frequency components, for various purposes. The frequency components/ranges may be used to identify the energy measurements for various frequency components or ranges. In this way, the signal-energy component may generate or determine the signal-energy data which indicates signal-energy measurements representing the speech utterance of the user 106. The signal-energy data may be later utilized to determine whether audio data 142 includes a speech utterance.

Further, the lip-movement/utterance component 218 may include a lip-movement/utterance aggregation component 242. The lip-movement/utterance aggregation component 242 may be configured to aggregate feature data for a user 106, such as lip-movement/utterance feature data 220. For instance, the lip-movement/utterance aggregation component 242 may combine lip-movement/utterance feature data 220 that has been extracted from various parings of image data 140 and audio data 142 that correspond to different instances where the user 106 used the user-recognition device 104. In such examples, the lip-movement/utterance aggregation component 242 may combine the lip-movement/utterance data 220 in various ways, such as by averaging the features of the lip-movement/utterance data 220.

The lip-movement/utterance component 218 may further include an automatic speech recognition (ASR) component 244 that is configured to generate the text data 222 from the audio data 142, such as through transcription. The ASR component 244 may perform any type of transcription to generate the text data 222 corresponding to the speech utterance represented in the audio data 142. For example, the ASR component 244 may include a processor that is configured to perform ASR and interprets the speech utterance in the audio data 142 based on the similarity between the utterance and pre-established ASR language models stored in an ASR model knowledge base. For example, the ASR processor may compare the input audio data with models for sounds (e.g., subword units or phonemes) and sequences of sounds to identify words that match the sequence of sounds spoken in the utterance of the audio data. However, any technique may be utilized by the ASR component 244 to transcribe the speech utterance in the audio data 142 into text data 222.

Once a user 106 is enrolled for use of the user-recognition system, an identity-verification component 246 may be utilized to determine and/or verify an identity of a user 106 that interacted with a user-recognition device 104. For example, the server(s) 108 may receive image data 140(2) and audio data 142(2) from the user-recognition device 104(2). The identity-verification component 246 may be configured to determine an identity of the user 106, where the enrollment database 226 indicates the identity of the user 106, and further indicates what user profile/profile 228 is associated with that user's identity.

The identity-verification component 246 may cause a facial-feature correspondence component 248 to perform various operations for determining or identifying a user 106 whose face is depicted in the received image data 140(2). For example, the facial-feature correspondence component 248 may compare the facial-feature data 220 for the received image data 140(2) with facial-feature data 220 stored in the enrollment database 226 for different user profiles 228 of users 106 enrolled in the user-recognition system in order to determine user profiles 228 for one or more users 106 whose respective facial-feature data 220 correspond to the extracted facial-feature data 220. The facial-feature correspondence component 248 may determine, based on the comparison, a top "N" group of user profiles 228 of users 106 whose respective facial-feature data 220 most strongly correspond to the extracted facial-feature data 220. In some examples, a single user identity/profile 228 may be determined as corresponding to the input facial-feature data 220. However, in some examples a group of top "N" candidates may be identified by the trained model(s) 234 as corresponding with a threshold amount of strength (e.g., 50% correspondence, 75% correspondence, etc.) to the extracted facial-feature data 220.

In such examples, the identity-verification component 246 may utilize one or more of the lip-movement/utterance feature data 220, and/or the text data 222 to verify, or select, the user profile 228 corresponding to the user 106 from the group of top N candidate profiles 228. For example, a lip-movement/utterance correspondence component 250 may further compare lip-movement/utterance feature data 220 with the lip-movement/utterance feature data 220 stored in the enrollment database 226 that is associated with the top N user profiles 228. The lip-movement/utterance correspondence component 250 may determine, from the top N user profiles 228, strengths of correspondence between the lip-movement/utterance feature data 220 and the various lip-movement/utterance feature data 220 stored in the enrollment database 226. In the example when the lip-movement/utterance feature data 220 comprise vectors, the lip-movement/utterance correspondence component 250 may compute respective distances between a vector of the lip-movement/utterance feature data 220 for recently received and processed image data 140 and audio data 142, and the respective vectors corresponding to the lip-movement/utterance feature data 220 for the top N user profiles 228. The user profile 228 whose corresponding vector stored in the enrollment database 226 that has the smallest distance between the extracted lip-movement/utterance feature data 220 may be selected as the user profile 228 that corresponds to the user 106 represented in the image data 140.

Additionally, or alternatively, the identify-verification component 246 may utilize the text data 222 to determine which user profile 228 to select from amongst the top N profiles 228. For example, the identity-verification component 246 may determine a strength of correspondence between text data 222 determined from the received audio data 142 and text data 222 for each of the top N user profiles 228. The identity-verification component 246 may determine, based on one or all of the different modalities (e.g., lip-movement/utterance feature data 220, facial-feature data 220, text data 222, etc.), which of the top N user profiles 228 corresponds most strongly to the image data 140 depicting the user 106 and the audio data 142 representing the speech utterance of the user 106.

In some examples, the identity-verification component 246 may utilize a fusion component 252 to determine, using one or all of the modalities, which of the top N user profiles 228 corresponds most strongly to the user 106 represented in the received image data 140 and audio data 142. For instance, the fusion component 252 may receive scores that indicate strength of correspondence for each of the different modalities. The facial-feature correspondence component 248 may determine, such as by comparing extracted facial-feature data 220 with the facial-feature data 220 stored in the enrollment database 226 for user profiles 228, scores indicating how strongly correlated (e.g., how big or small the "distances" are between vectors"), or how strong of a correspondence, there is between facial-feature data 220 when comparing features of the received image data 140 with features associated with the user profiles 228. Further, the lip-movement/utterance correspondence component 250 may determine, such as by comparing extracted lip-movement/utterance feature data 220 with the lip-movement/utterance feature data 220 stored in the enrollment database 226 for user profiles 228, scores indicating how strongly correlated, or how strong of a correspondence, there is between lip-movement/utterance feature data 220 when comparing features of the received image data 140 and audio data 142 with features associated with the user profiles 228.

Similarly, the identity-verification component 246 may determine scores indicating a strength of correlation between the text data 222 for received audio data 142 with the text data 222 corresponding to the user profiles 228. The fusion component 252 may then determine, based one or more of the scores indicating the various strengths of correlation/correspondence, which of the user profiles 228 from amongst the top N user profiles 228 corresponds to the user 106 that is being recognized by the user-recognition system. For example, the fusion component 252 may perform an AND based decision where correlation must exist in all of the modalities, may perform an averaging between the scores, or any other method for determining which of the user profiles 228 to select.

The memory 208 may further store a relative-transfer-function component 256 for determining relative transfer functions to apply to different audio signals to remove any differences introduced between enrollment and recognition audio signals based solely on the different acoustic responses of the microphones that generated these signals. The relative-transfer-function component 256 may receive the relative transfer functions for different microphone pairs, and/or may calculate/determine the relative transfer functions. For example, the relative transfer functions may be calculated by placing a first type of microphone proximate to a second type of microphone and having each microphone generate a respective audio signal from common sound. Thereafter, the two audio signals may be compared to one another to determine an acoustic relationship between the microphones. In some instances, each of the two adjacent microphones may be subject to multiple different sounds of different frequencies or the like for generating the relative transfer function. In some instances, the component 256 may calculate a first relative transfer function for the microphone pair in a first direction (first microphone to second microphone) and a second relative transfer function for the microphone pair in a second, opposite direction (second microphone to first microphone).

In some instances, the relative-transfer-function component 256 may determine (e.g., receive or calculate) different relative transfer functions for many different microphone pairs. The component 256 may then store an indication of these relative transfer functions in a relative-transfer-function database 224. The component 256 may store a microphone-to-microphone mapping, or may determine which microphones reside in which devices and may store a device-to-device or device-to-microphone mapping. For example, the component 256 may store an indication that a particular make and model of mobile telephone is associated with a first relative transfer function with reference to a particular user-recognition device or with reference to a microphone used by a particular user-recognition device. Therefore, enrollment audio signals received from that particular make and model of mobile telephone may be subject to the relative transfer function prior to comparison to an audio signal generated by the particular enrollment device. Therefore, the relative-transfer-function component 256 may apply the particular transfer function to the enrollment audio signal prior to the identity-verification component 246 comparing the audio signals in the manner described above.

The memory 208 may further include a liveness-detection component 254 that is configured to determine whether image data 140 depicts an actual user 106, or a potential fraudulent user. For example, the liveness-detection component 254 may analyze the lip-movement/utterance feature data 220 to determine whether or not the depicted user 106 is speaking a speech utterance (e.g., whether lip movement is represented in the image data 140, whether a speech utterance is represented in the audio data 142, etc.). This may prevent malicious users from utilizing a false representation of a user's face (e.g., hologram, mask, picture, etc.) along with a recording of the speech utterance in order to fraudulently purchase items 110 using the user profile 228 of another user 106.

Additionally, the memory 208 may store a quality-check component 258 which determines an overall metric of how good the extracted facial-feature data 220 is, and/or an overall metric of how good the extracted lip-movement/ utterance feature data 22 is. For instance, the quality-check component 258 may determine that additional image data 140 needs to be obtained for a user 106 for various reasons, such as hair covering the user's 106 face, a hand occluding the face, etc. Additionally, the quality-check component 258 may determine that additional audio data 142 needs to be collected for the user 106 speaking the speech utterance because, for example, there is too much background noise represented in the audio data 142. In some examples, the quality-check component 258 may utilize a trained model(s) 234 to determine if a feature vector is a good quality feature vector, or a bad quality feature vector.

Figure 3A:
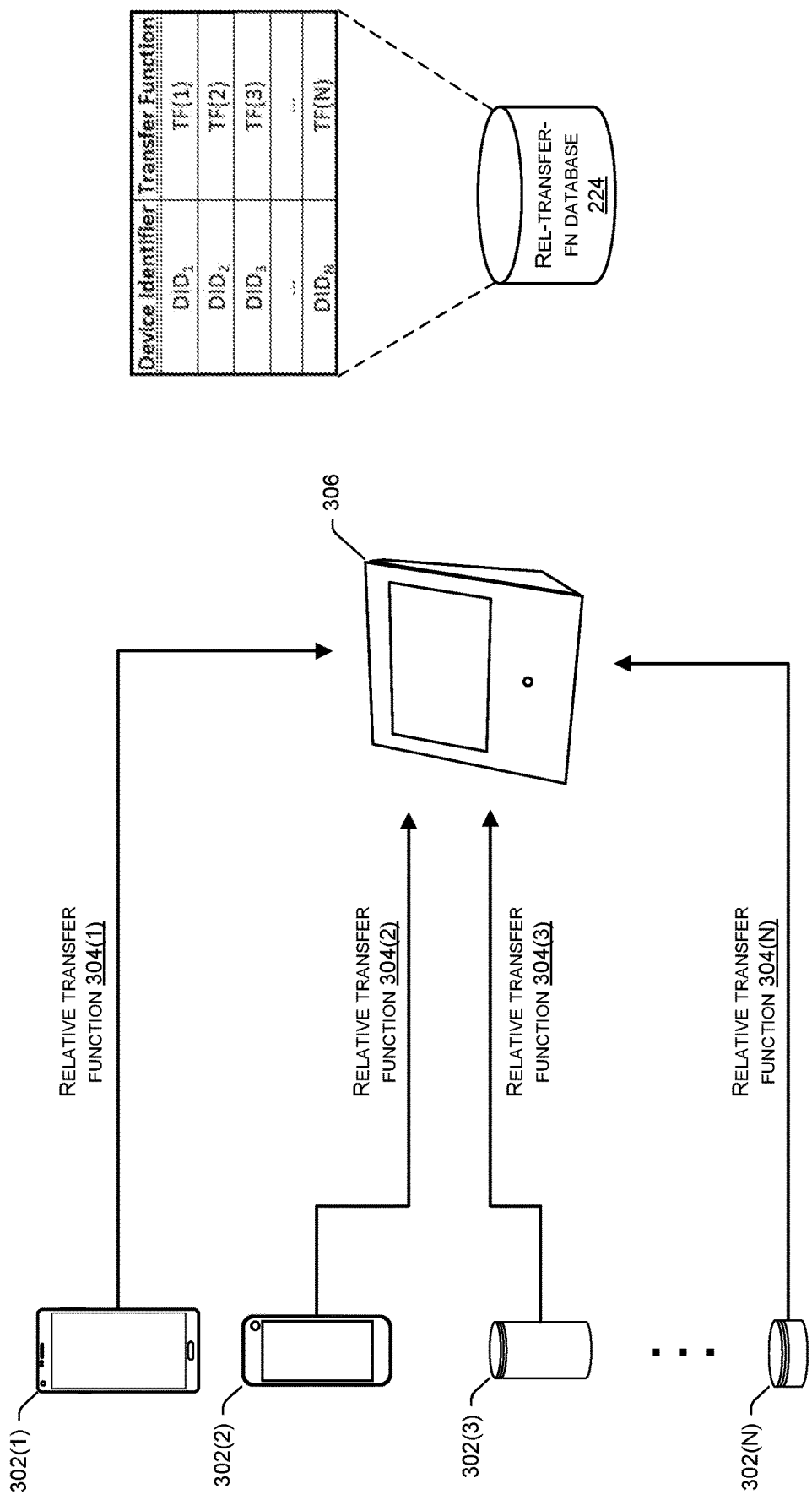
FIG. 3A illustrates an example scenario for determining relative transfer functions from each of multiple client devices to a device used in the user-recognition system for increasing accuracy of user recognition.

FIG. 3A illustrates an example scenario for determining relative transfer functions 304(1), (2), (3), . . . , (N) from each of multiple client devices 302(1), (2), (3), . . . , (N) to a device 306 used in the user-recognition system for increasing accuracy of user recognition. That is, FIG. 3A illustrates that a first relative transfer function 304(1) may be applied to audio signals generated by a first device 302(1) when the signals are to be compared with audio signals generated by the device 306, a second relative transfer function 304(2) may be applied to audio signals generated by a second device 302(2), and so forth. As illustrated, the relative-transfer-function database 224 may store a mapping of device identifiers to relative transfer functions. For example, the database 224 indicates that a first device identifier (DID') (e.g., a device ID associated with the first device 302(1)) is associated with a first relative transfer function (TF(1)), a second device identifier ($DID_2$) is associated with a second relative transfer function (TF(1)), and so forth.

Therefore, when the device 306 generates an audio signal for use in recognizing a user that speaks a predefined utterance, the appropriate relative transfer functions may be used prior to the comparison. For example, in instances where the device 306 generates image data of the user speaking the utterance, the image data may be used by the user-recognition system to determine a candidate list of N user profiles that may be associated with the user speaking the utterance. For each of these N users, the user-recognition system may identify the type of device (or microphone) used when the user associated with the user profile used upon enrollment and, with that information, may reference the relative-transfer-function database 224 to determine the appropriate relative transfer function to apply to the stored enrollment audio signal. Each respective audio signal generated based on applying the respective selected relative transfer function to each respective enrollment audio signal may then be compared to the audio signal generated by the device 306. It is to be appreciated that while FIG. 3A illustrates a mapping of transfer functions to apply to signals generated by client devices when these signals are to be compared to signals generated by the particular user-recognition device 306, in other instances multiple different user-recognition devices may be utilized and, thus, the database 224 may store multiple different relative transfer functions to apply to the client-device audio signals based on which particular user-recognition device is generating the signal for the comparison.

Figure 3B:
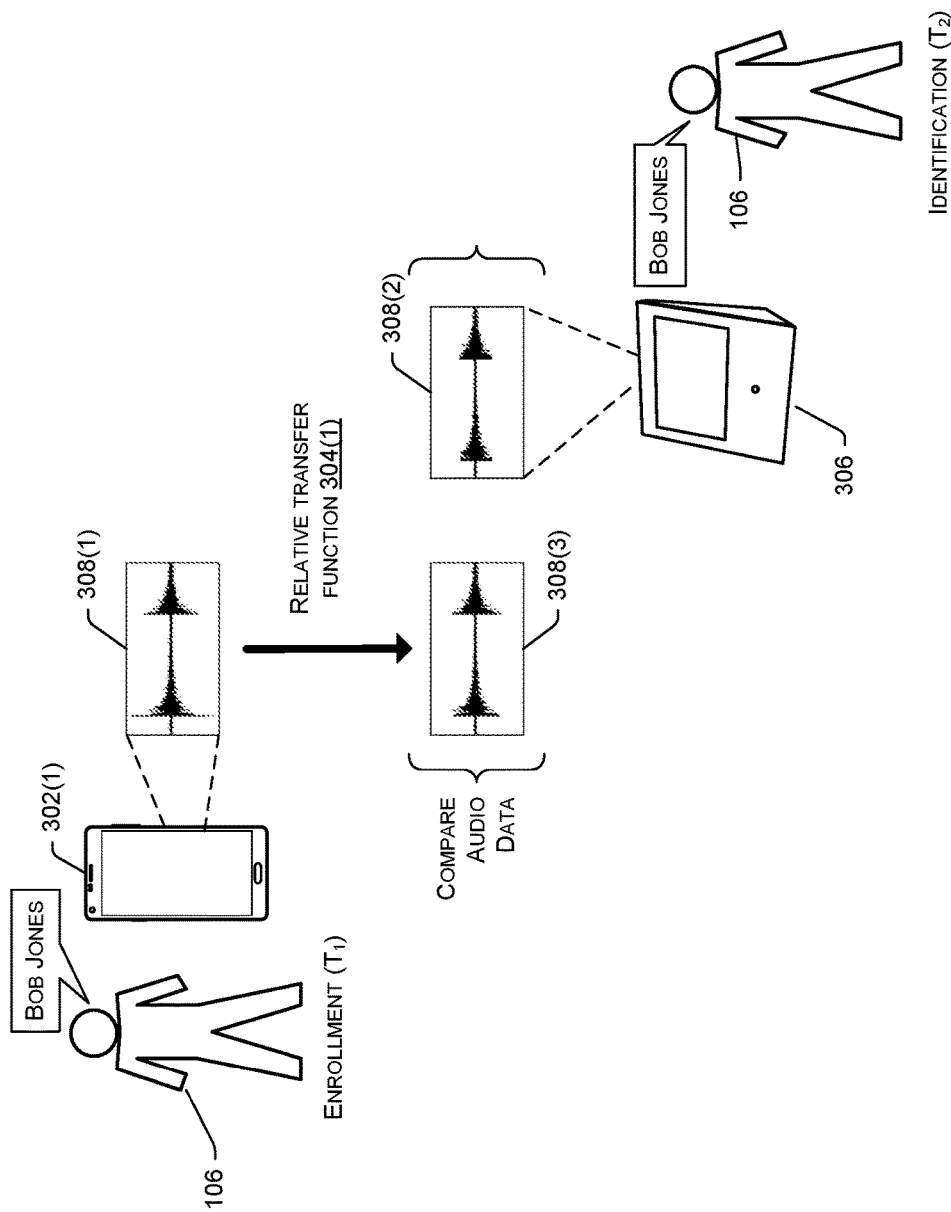
FIG. 3B illustrates an example scenario of using the appropriate relative transfer function from FIG. 3A to identify a user.

FIG. 3B illustrates an example scenario of using the appropriate relative transfer function from FIG. 3A to identify a user 106 in this manner. For example, a top-left portion of this figure illustrates that the user 106 enrolls with the user-recognition system by, in part, stating his name ("Bob Jones") to the first client device 302(1). This audio signal 308(1), and/or generated/extracted features thereof, may be sent to the user-recognition system for storage in association with a user profile of the user 106.

Sometime thereafter, the user 106 may visit a facility having the user-recognition device 306 and may again state his name ("Bob Jones") for the purpose of being recognized at the facility. The user-recognition device 306 may generate a second audio signal 308(2) and may send this audio signal 308(2) to the user-recognition system. In some instances, the user-recognition system may determine a list of candidate user profiles for which to compare respective enrollment audio signals to the audio signal 308(2) generated by the device 306. For example, the user-recognition system may user image data, text data associated with the utterance, and/or other information for determining these candidate user profiles.

After determining one or more candidate user profiles, such as the user profile associated with the user 106, the user-recognition system may determine a relative transfer function to apply to the enrollment audio signal 308(1) associated with the user profile of the user 106. For example, the user-recognition system may determine, from the user profile of the user 106, that the enrollment signal 308(1) was generated using the client device 302(1) (or, depending on which the profiles stores, was generated with a particular type of microphone). The user-recognition system may then analyze the relative-transfer-function database 224 to determine the relative transfer function to apply to the enrollment audio signal 308(1) when comparing such signals to signals generated by the particular user-recognition device 306. In this example, the user-recognition system will determine, from the database 224, to apply the relative transfer function 304(1) to the enrollment audio signal 308(1) to generate a third audio signal 308(3). Thereafter, the user-recognition system may compare the second audio signal 308(2) to the third audio signal 308(3) to determine whether the user 106 that spoke the utterance to the device 306 is associated with the user profile that is associated with the enrollment audio signal 308(1).

Figure 3C:
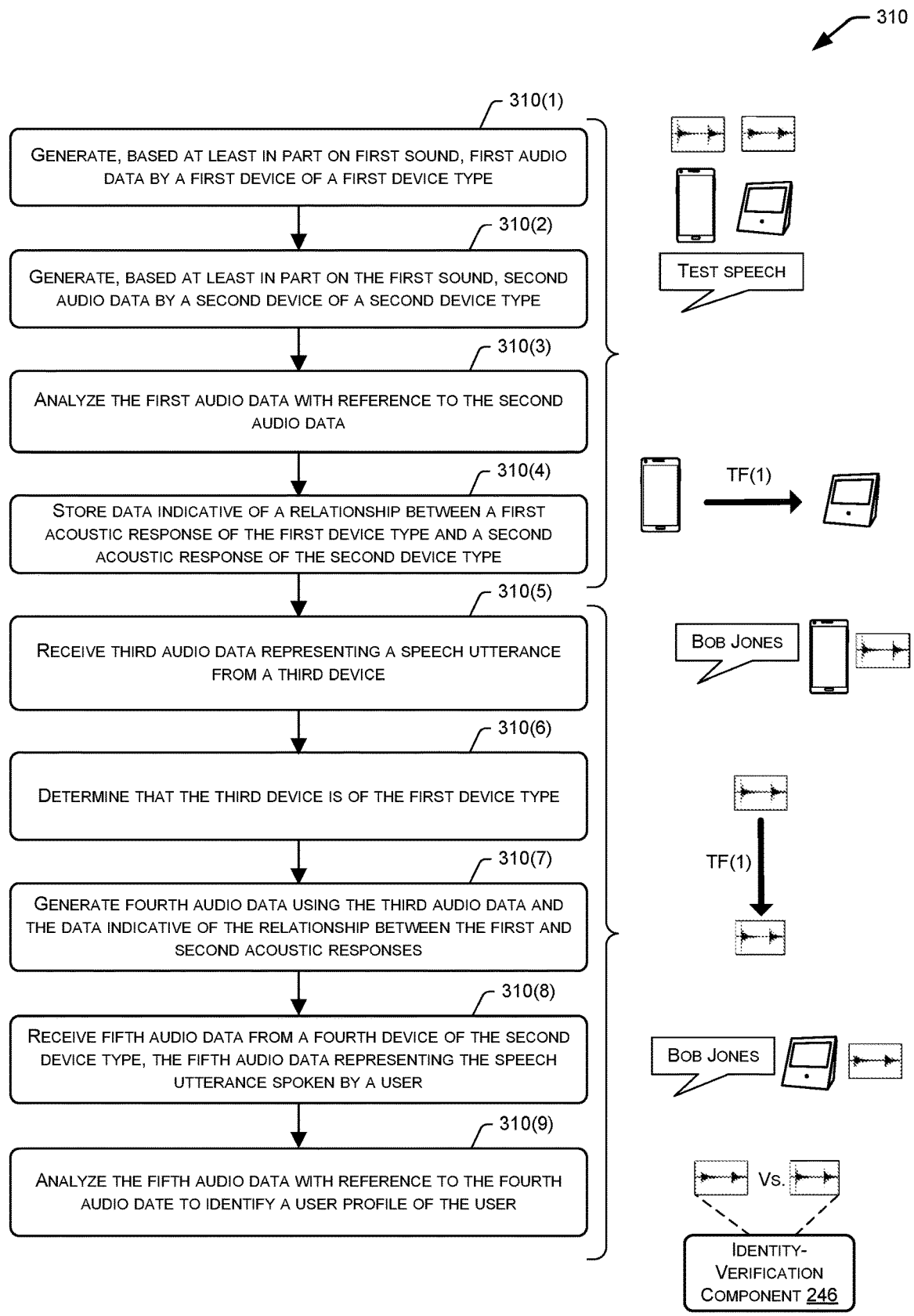
FIG. 3C illustrates an example process for configuring a user-recognition system and using the system to identify a user.

FIG. 3C illustrates an example process 310 for configuring a user-recognition system and using the system to identify a user. Each process discussed herein may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation. Furthermore, and as described below, any storage of or operation upon "audio data" may include storage of or operation upon raw audio signals, filtered or otherwise processed audio signals, feature data generated using the audio signals, and/or the like.

At 310(1), a first device of a first device type may generate first audio data based on first sound. At 310(2), meanwhile, a second device of a second device type may generate second audio data based on the first sound. For example, the first and second devices may be located proximate to one another and may generate audio signals based on the same sound at the same time, such that the resulting audio signals may be compared to one another to identify differences between the acoustic responses of the microphones of the different devices.

At 310(3), the relative-transfer-function component 256, or another component, may analyze the first audio data relative to the second audio data. For example, the relative-transfer-function component 256 may analyze amplitude, frequency, and other acoustic components of the first audio data relative to the second audio data to identify differences therebetween. At 310(4), the relative-transfer-function component 256 may store data indicative of a relationship between an acoustic response of the first device type and an acoustic device of the second device type (or first and second microphones therein). For example, the relative-transfer-function component 256 may store this data as a relative transfer function for applying to audio data generated by the first device type. In some instances, the relative-transfer-function component 256 may store two relative transfer functions, one for applying to audio data generated by a first device type prior to comparing to audio data generated by the second device type and, alternatively, one to apply to audio data generated by a second device type prior to comparing to audio generated by the first device type.

At 310(5), a user-recognition system may receive third audio data, representing a first instance of a speech utterance, from a third device. In some instances, this audio data comprises enrollment audio data generated by a client device or a user-recognition device at a facility during the enrollment process. At 310(6), the user-recognition system determines that the third device is of the first device type. For example, the device that generated the third audio data may have provided, to the user-recognition system, information for identifying the third device, a device type of the third device, a microphone residing in the third device, and/or the like.

Based on determining that the third device is of the first device type, at 310(7) the relative-transfer-function component 256 generates fourth audio data based on the third audio data and the data indicative of the relationship of the acoustic response of the first device type and the acoustic response of the second device type. At 310(8), the user-recognition system may receive fifth audio data from a fourth device, the fifth audio data representing a second instance of the speech utterance. For example, the user-recognition system may receive the fifth audio data from a user-recognition device residing in a facility at which the user is attempting to be recognized. At 310(9), the identity-verification component 246 may analyze the received fifth audio data to the previously generated fourth audio data. Based at least in part on this analysis, the identity-verification component may determine whether or not the user that spoke the second instance of the speech utterance corresponds to the user that spoke the first instance of the utterance during enrollment.

Figure 4A:
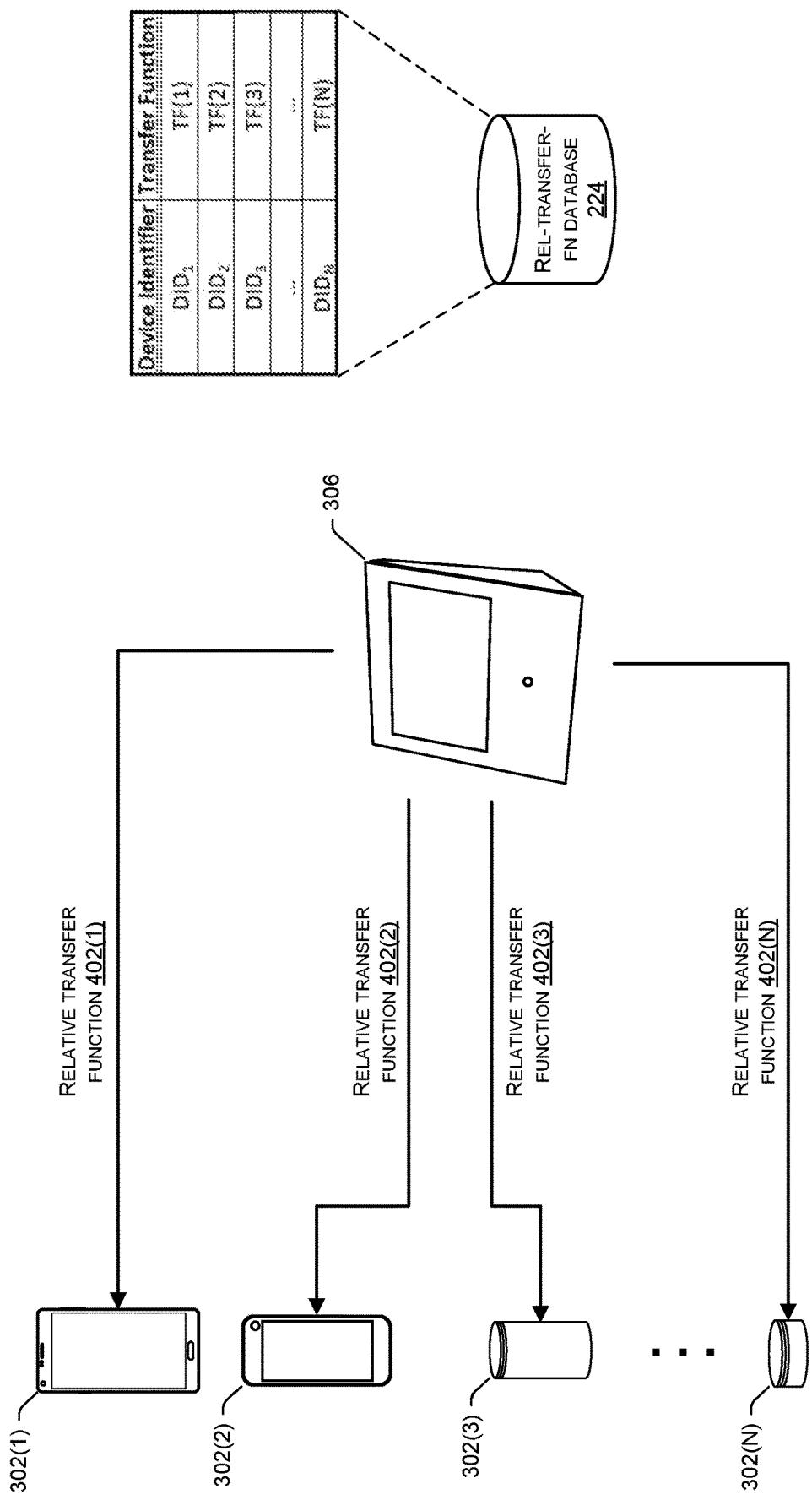
FIG. 4A illustrates an example scenario for determining relative transfer functions from a device used in the user-recognition system to each of multiple client devices for increasing accuracy of user recognition.

FIG. 4A, meanwhile, illustrates an example scenario for determining relative transfer functions 402(1), (2), (3), . . . , (N) from the user-recognition device 306 to each of the multiple client devices 302(1), (2), (3), . . . , (N) to a device 306 used in the user-recognition system for increasing accuracy of user recognition. That is, FIG. 4A illustrates that a first relative transfer function 402(1) may be applied to audio signals generated by the device 306 prior to comparison with audio signals generated by the first device 302(1), a second relative transfer function 402(2) may be applied to audio signals generated by the device 306 prior to comparison with audio signals generated by the second device 302(2), and so forth. As illustrated, the relative-transfer- function database 224 may store a mapping of device identifiers to relative transfer functions.

Therefore, when the device 306 generates an audio signal for use in recognizing a user that speaks a predefined utterance, the appropriate relative transfer functions may be used prior to the comparison. For example, in instances where the device 306 generates image data of the user speaking the utterance, the image data may be used by the user-recognition system to determine a candidate list of N user profiles that may be associated with the user speaking the utterance. For each of these N users, the user-recognition system may identify the type of device (or microphone) used when the user associated with the user profile used upon enrollment and, with that information, may reference the relative-transfer-function database 224 to determine the appropriate relative transfer function to apply to the audio signal generated by the user-recognition device 306 generated at the time of recognition (e.g., at the facility 102). Each respective audio signal generated based on applying the respective selected relative transfer function to the recognition audio signal may then be compared to the respective enrollment audio signal.

Figure 4B:
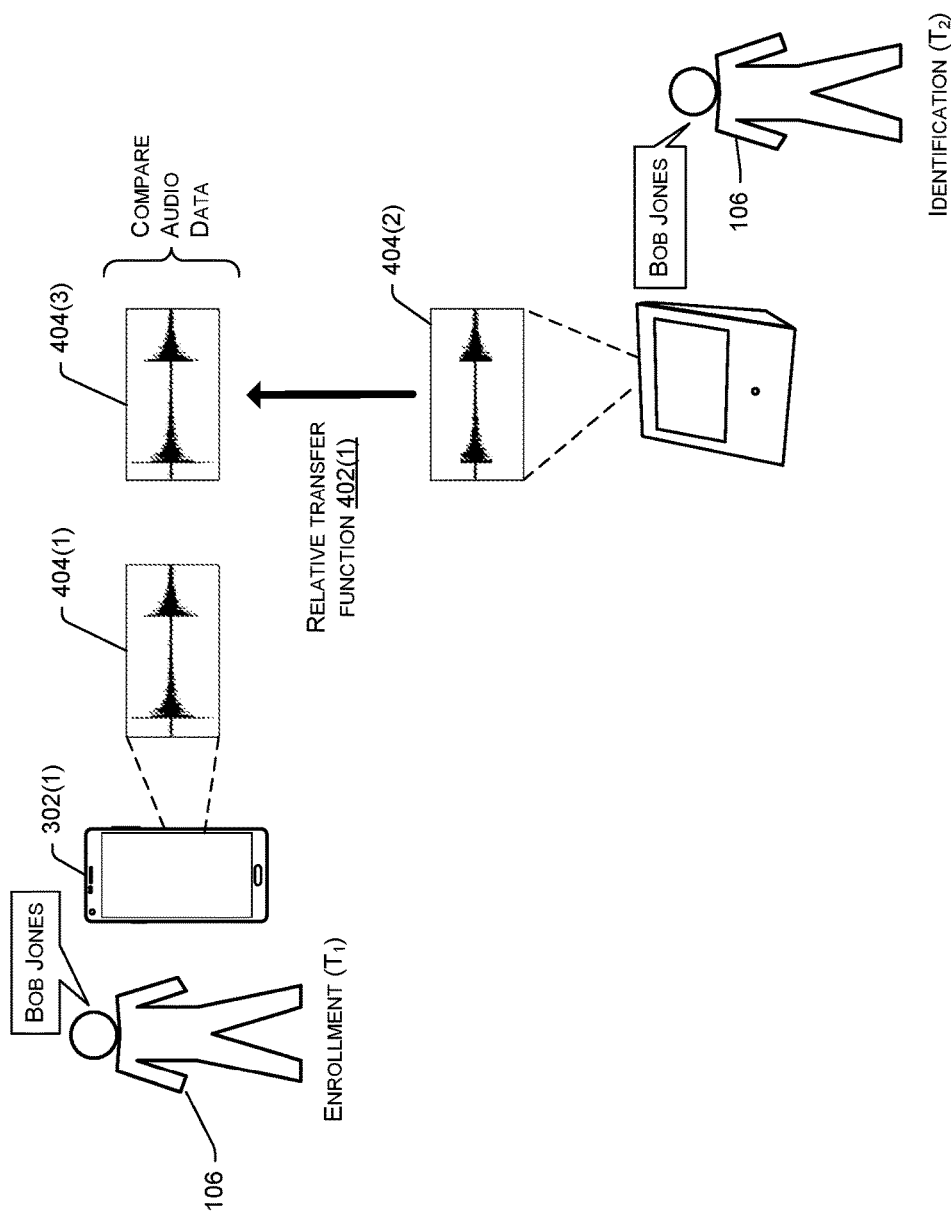
FIG. 4B illustrates an example scenario of using the appropriate relative transfer function from FIG. 4A to identify a user.

FIG. 4B illustrates an example scenario of using the appropriate relative transfer function from FIG. 4A to identify a user 106 in this manner. For example, a top-left portion of this figure illustrates that the user 106 enrolls with the user-recognition system by, in part, stating his name ("Bob Jones") to the first client device 302(1). This audio signal 404(1), and/or generated/extracted features thereof, may be sent to the user-recognition system for storage in association with a user profile of the user 106.

Sometime thereafter, the user 106 may visit a facility having the user-recognition device 306 and may again state his name ("Bob Jones") for the purpose of being recognized at the facility. The user-recognition device 306 may generate a second audio signal 404(2) and may send this audio signal 404(2) to the user-recognition system. In some instances, the user-recognition system may determine a list of candidate user profiles for which to compare respective enrollment audio signals to the audio signal 404(2) generated by the device 306. For example, the user-recognition system may user image data, text data associated with the utterance, and/or other information for determining these candidate user profiles.

After determining one or more candidate user profiles, such as the user profile associated with the user 106, the user-recognition system may determine a relative transfer function to apply to the recognition audio signal 404(2) prior to comparing the resulting audio signal to the audio signal associated with each respective user profile, such as the profile of the user 106. For example, the user-recognition system may determine, from the user profile of the user 106, that the enrollment signal 404(1) was generated using the client device 302(1) (or, depending on which the profiles stores, was generated with a particular type of microphone). The user-recognition system may then analyze the relative-transfer-function database 224 to determine the relative transfer function to apply to the recognition audio signal 404(2) prior to comparison with the enrollment audio signal 404(1). In this example, the user-recognition system will determine, from the database 224, to apply the relative transfer function 402(1) to the recognition audio signal 404(2) to generate a third audio signal 404(3). Thereafter, the user-recognition system may compare the first audio signal 404(1) to the third audio signal 404(3) to determine whether the user 106 that spoke the utterance to the device 306 is associated with the user profile that is associated with the enrollment audio signal 404(1).

Figure 4C:
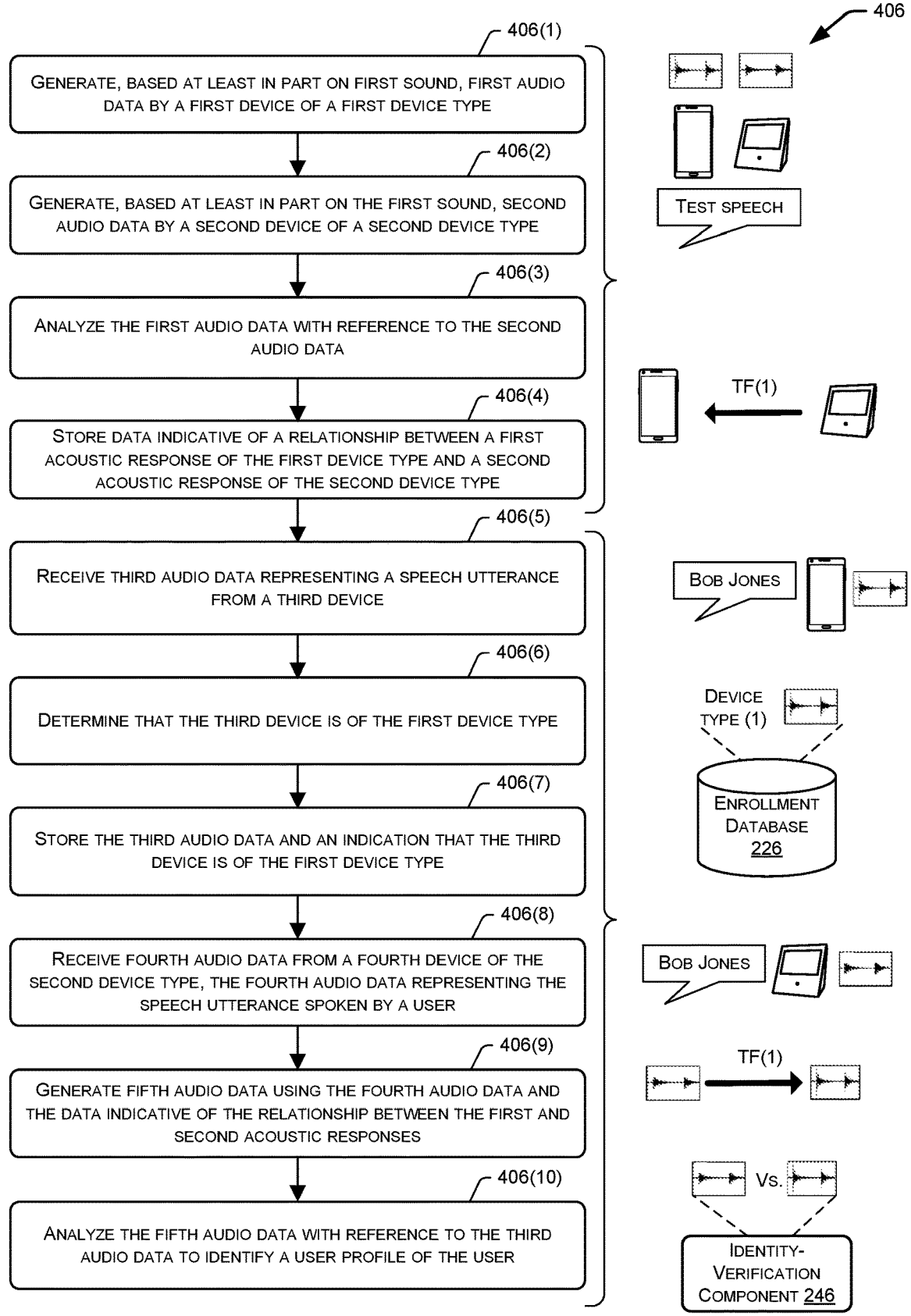
FIG. 4C illustrates an example process for configuring a user-recognition system and using the system to identify a user.

FIG. 4C illustrates an example process 406 for configuring a user-recognition system and using the system to identify a user. At 406(1), a first device of a first device type may generate first audio data based on first sound. At 406(2), meanwhile, a second device of a second device type may generate second audio data based on the first sound. For example, the first and second devices may be located proximate to one another and may generate audio signals based on the same sound at the same time, such that the resulting audio signals may be compared to one another to identify differences between the acoustic responses of the microphones of the different devices.

At 406(3), the relative-transfer-function component 256, or another component, may analyze the first audio data relative to the second audio data. For example, the relative-transfer-function component 256 may analyze amplitude, frequency, and other acoustic components of the first audio data relative to the second audio data to identify differences therebetween. At 406(4), the relative-transfer-function component 256 may store data indicative of a relationship between an acoustic response of the first device type and an acoustic device of the second device type (or first and second microphones therein). For example, the relative-transfer-function component 256 may store this data as a relative transfer function for applying to audio data generated by the first device type. In some instances, the relative-transfer-function component 256 may store two relative transfer functions, one for applying to audio data generated by a first device type prior to comparing to audio data generated by the second device type and, alternatively, one to apply to audio data generated by a second device type prior to comparing to audio generated by the first device type.

At 406(5), a user-recognition system may receive third audio data, representing a first instance of a speech utterance, from a third device. In some instances, this audio data comprises enrollment audio data generated by a client device or a user-recognition device at a facility during the enrollment process. At 406(6), the user-recognition system determines that the third device is of the first device type. For example, the device that generated the third audio data may have provided, to the user-recognition system, information for identifying the third device, a device type of the third device, a microphone residing in the third device, and/or the like. At 406(7), the third audio data is stored in association with a user profile of the user.

At 406(8), the user-recognition system may receive fourth audio data from a fourth device of the second device type, the fourth audio data representing a second instance of the speech utterance. For example, the user-recognition system may receive the fourth audio data from a user-recognition device residing in a facility at which the user is attempting to be recognized. At 406(9), the relative-transfer-function component 256 may generate fifth audio based on the fourth audio data and the data indicative of the relationship between the acoustic responses of the first and second device types. Finally, at 406(10), the identity-verification component 246 may analyze the generated fifth audio data to the previously received third audio data. Based at least in part on this analysis, the identity-verification component may determine whether or not the user that spoke the second instance of the speech utterance corresponds to the user that spoke the first instance of the utterance during enrollment.

Figure 5A:
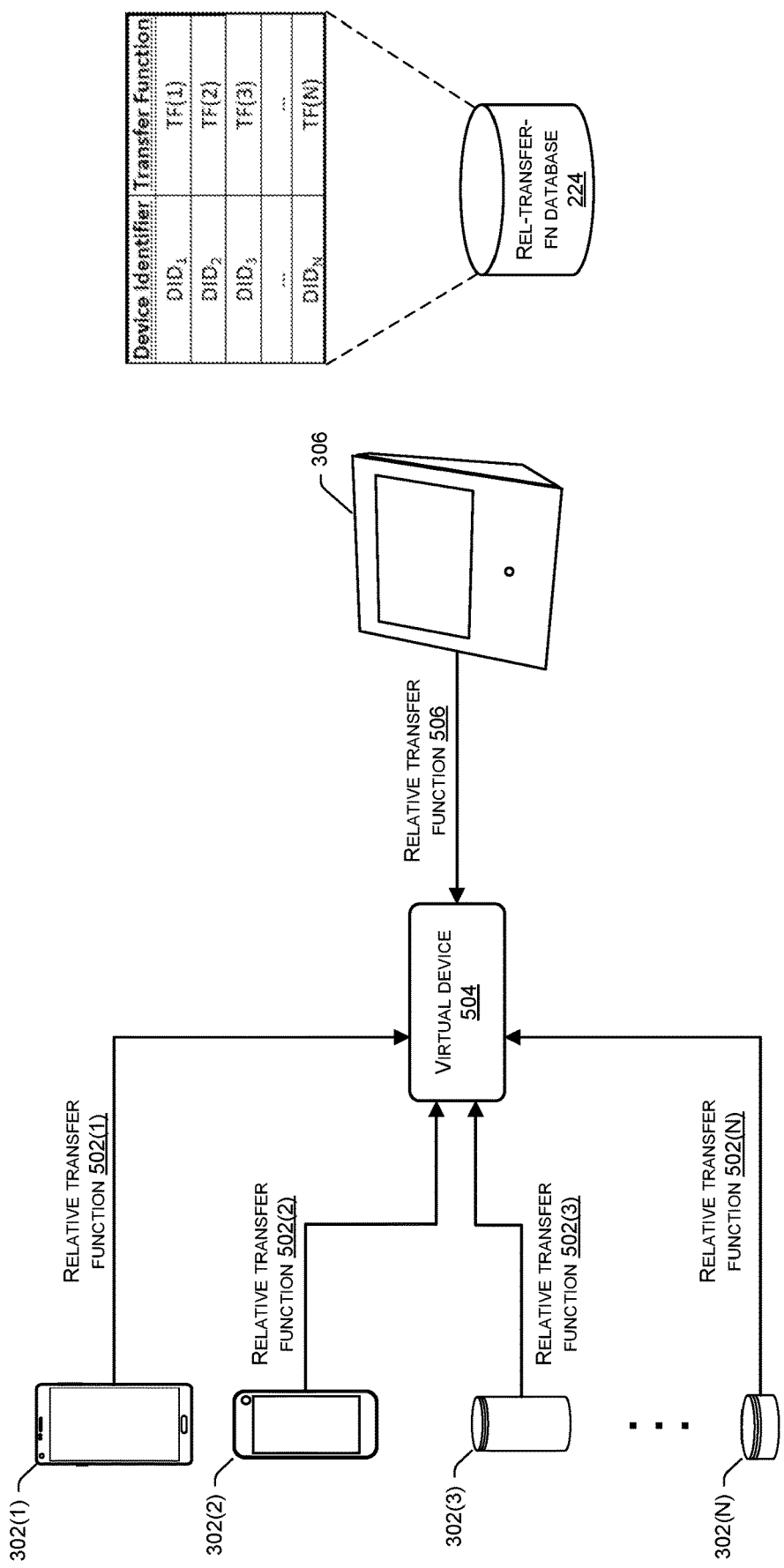
FIG. 5A illustrates an example scenario for determining relative transfer functions from each of multiple client devices to a virtual device, and a relative transfer function from a device used in the user-recognition system to the virtual device, for increasing accuracy of user recognition.

FIG. 5A, meanwhile, illustrates an example scenario for determining relative transfer functions 502(1), (2), (3), . . . , (N) from each of the multiple client devices 302(1), (2), (3), . . . , (N) to a virtual device 504, as well as a transfer function 506 to apply from the device 306 used in the user-recognition system to the virtual device 504. That is, while FIG. 3A illustrates applying a transfer function to audio data generated by client devices, and FIG. 4A illustrates applying a transfer function to audio data generated by the user-recognition device 308, FIG. 5A illustrates an example where both audio data generated by a client device (e.g., at a time of enrollment) and audio data generated by the user-recognition device (e.g., at a time of identification) is subjected to an appropriate transfer function as between that device and the virtual device 504. In some examples, the virtual device 504 may represent a device having a microphone that has an archetypal audio response—that is, a response that corresponds exactly or approximately exactly to captured audio. As illustrated, the relative-transfer-function database 224 may store a mapping of device identifiers to relative transfer functions.

Therefore, when a client device, such as the device 302(1), generates an audio signal for use in recognizing a user that speaks a predefined utterance, the appropriate relative transfer functions may be used prior to the comparison. Similarly, when the device 306 generates an audio signal for use in recognizing a user that speaks a predefined utterance, the appropriate relative transfer functions may be used prior to the comparison. For example, in instances where the device 306 generates image data of the user speaking the utterance, the image data may be used by the user-recognition system to determine a candidate list of N user profiles that may be associated with the user speaking the utterance. For each of these N users, the user-recognition system may identify the type of device (or microphone) used when the user associated with the user profile used upon enrollment and, with that information, may reference the relative-transfer-function database 224 to determine the appropriate relative transfer function to apply to the audio signal generated by the user-recognition device 306 generated at the time of recognition (e.g., at the facility 102) and the appropriate relative transfer function to apply to the stored enrollment audio signal (unless the appropriate relative transfer function was applied to this audio signal upon enrollment or at any other time prior to the comparison). After each of the "N" candidate audio signals has been transformed, it may be compared to the now-transformed audio signal from the user-recognition device 306.

Figure 5B:
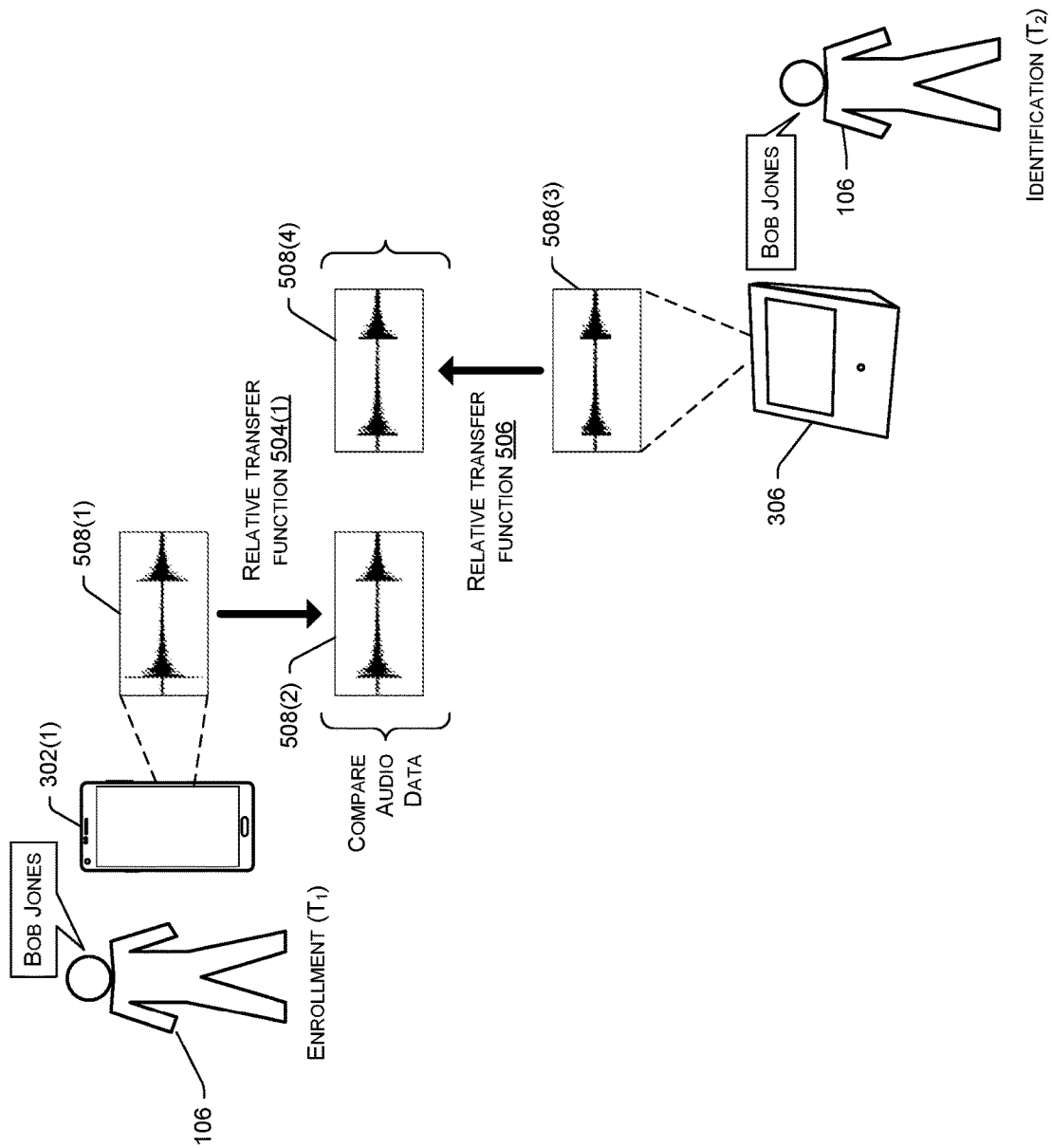
FIG. 5B illustrates an example scenario of using the appropriate relative transfer function from FIG. 5A to identify a user.

FIG. 5B illustrates an example scenario of using the appropriate relative transfer functions from FIG. 5A to identify a user 106 in this manner. For example, a top-left portion of this figure illustrates that the user 106 enrolls with the user-recognition system by, in part, stating his name ("Bob Jones") to the first client device 302(1). This audio signal 508(1), and/or generated/extracted features thereof, may be sent to the user-recognition system for storage in association with a user profile of the user 106. In other instances, meanwhile, the system may determine the appropriate relative transfer function 504(1) to apply to the audio signal for generating audio signal 508(2) and may store this audio signal 508(2) in addition to or rather than the audio signal 504(1).

In either instance, sometime thereafter, the user 106 may visit a facility having the user-recognition device 306 and may again state his name ("Bob Jones") for the purpose of being recognized at the facility. The user-recognition device 306 may generate another audio signal 508(3) and may send this audio signal 508(3) to the user-recognition system. In some instances, the user-recognition system may determine a list of candidate user profiles for which to compare respective enrollment audio signals to the audio signal 508(3) generated by the device 306. For example, the user-recognition system may user image data, text data associated with the utterance, and/or other information for determining these candidate user profiles.

After determining one or more candidate user profiles, such as the user profile associated with the user 106, the user-recognition system may determine a relative transfer function 506 to apply to the recognition audio signal 508(3) prior to comparing the resulting audio signal to the audio signal associated with each respective user profile, such as the profile of the user 106. For example, the user-recognition system may determine, from the relative-transfer-function database 224, the relative transfer function 506 to apply to the recognition audio signal 508(3) in order to generate audio data 508(4) in the form of the virtual device 504. Thereafter, the user-recognition system may compare the second audio signal 508(2) to the fourth audio signal 508(4) to determine whether the user 106 that spoke the utterance to the device 306 is associated with the user profile that is associated with the enrollment audio signal 508(2).

Figure 5C:
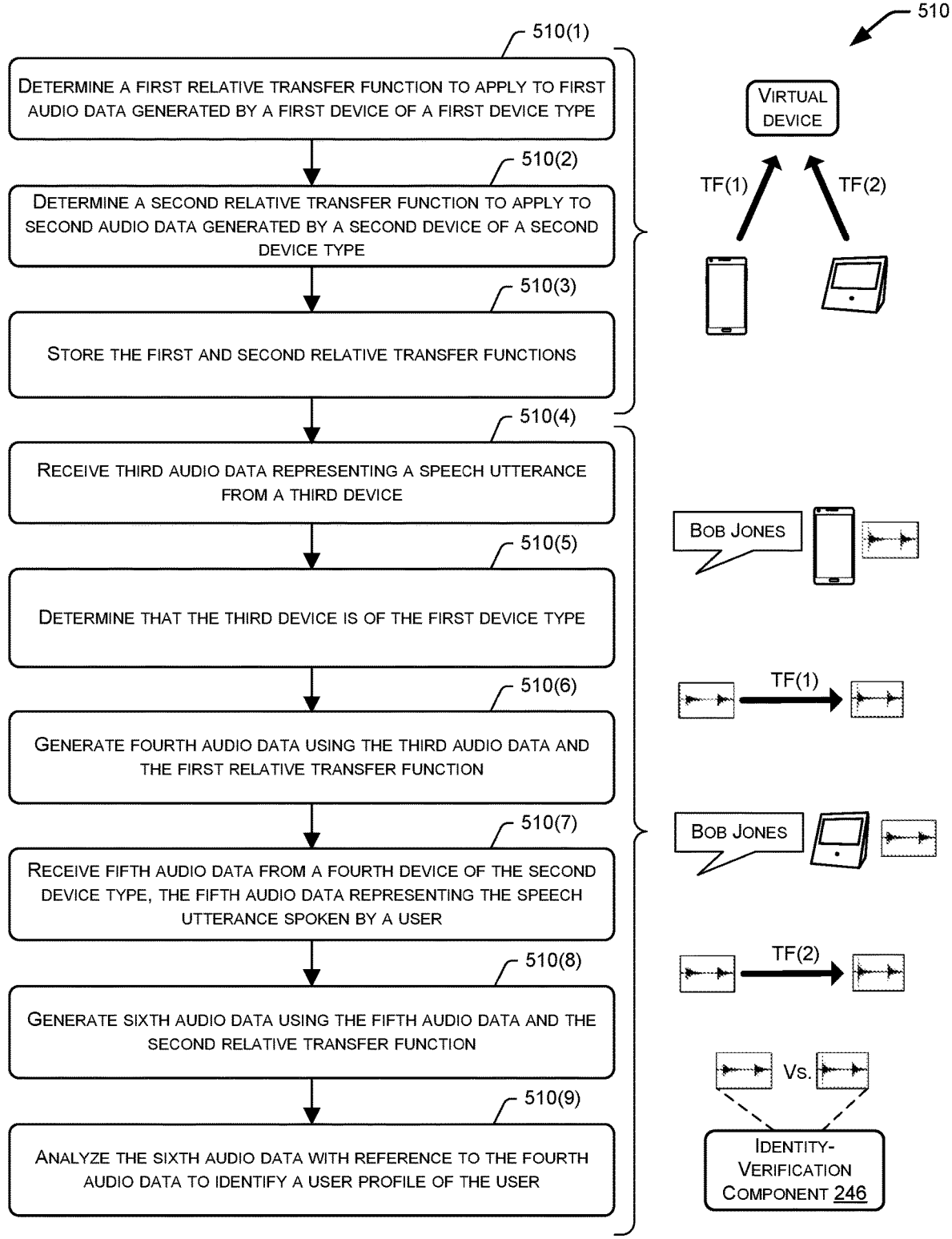
FIG. 5C illustrates an example process for configuring a user-recognition system and using the system to identify a user.

FIG. 5C illustrates an example process 510 for configuring a user-recognition system and using the system to identify a user. At 510(1), a first relative transfer function may be determined for applying to audio data generated by a first device of a first device type. For example, a relative transfer function may be determined in order to align audio data generated by devices of the first device type with the virtual device 504. Similarly, at 510(2), a second relative transfer function may be determined for applying to audio data generated by a second device of a second device type. For example, a relative transfer function may be determined in order to align audio data generated by a user-recognition device with the virtual device 504. At an operation 506, the first and second relative transfer functions are stored in a relative-transfer-function database, for example.

At 510(4), a user-recognition system may receive third audio data, representing a first instance of a speech utterance, from a third device. In some instances, this audio data comprises enrollment audio data generated by a client device or a user-recognition device at a facility during the enrollment process. At 510(5), the user-recognition system determines that the third device is of the first device type. For example, the device that generated the third audio data may have provided, to the user-recognition system, information for identifying the third device, a device type of the third device, a microphone residing in the third device, and/or the like. At 510(6), fourth audio data may be generated by applying the first transfer function to the third audio data. The fourth audio data may then be stored in association with the user profile of the user. In other instances, meanwhile, the third audio data may additional or alternatively be stored in association with a user profile of the user, along with an indication of the first relative transfer function, the first device type, or the like. In these instances, the fourth audio data may be generated at a later time by applying the first relative transfer function to the third audio data.

At 510(7), the user-recognition system may receive fifth audio data from a fourth device of the second device type, the fifth audio data representing a second instance of the speech utterance. For example, the user-recognition system may receive the fifth audio data from a user-recognition device residing in a facility at which the user is attempting to be recognized. At 510(8), the relative-transfer-function component 256 may generate sixth audio based on the fifth audio data and the second relative transfer function. Finally, at 510(9), the identity-verification component 246 may analyze the generated sixth audio data to the previously received fourth audio data. Based at least in part on this analysis, the identity-verification component may determine whether or not the user that spoke the second instance of the speech utterance corresponds to the user that spoke the first instance of the utterance during enrollment.

Figure 6:
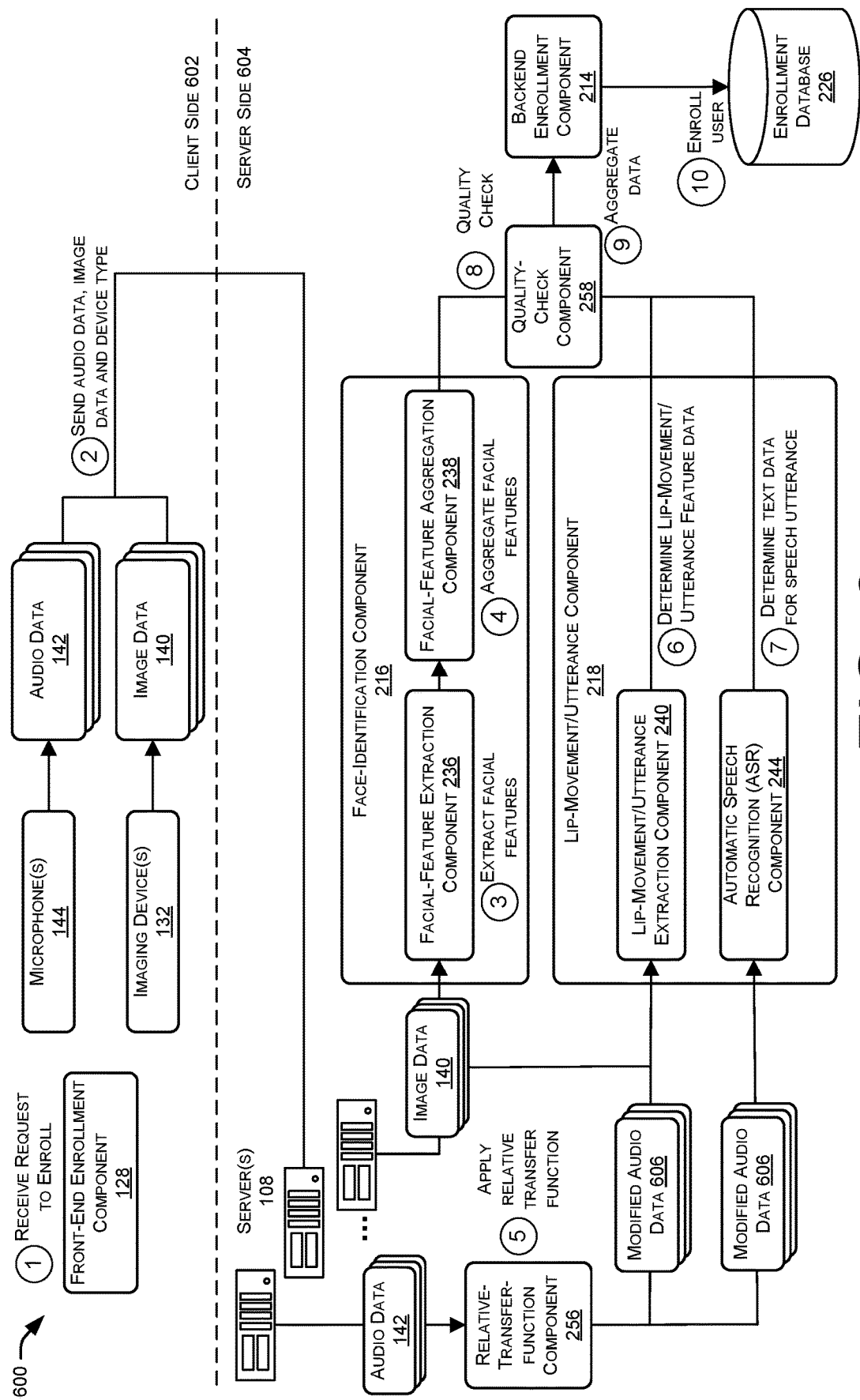
FIG. 6 illustrates an example environment including a block diagram of one or more servers configured to support at least a portion of the functionality of a user-recognition system, as well as an example flow of data within the system for enrolling a user for use of the user-recognition system.

FIG. 6 illustrates an example environment 600 including block diagram of one or more servers 108 configured to support at least a portion of the functionality of a user-recognition system, as well as an example flow of data within the system for enrolling a user 106 for use of the user-recognition system.

As illustrated, the environment 600 includes a client side 602 and a server side 604. However, this is merely illustrative, and some or all of the techniques may be performed entirely on the client side 602, or entirely on the server side 604. At "1," a front-end enrollment component 128 may receive a request to enroll a user 106 for use of the user-recognition system. For example, the request may comprise various types of input, such as a selection made via an I/O interface 134 (e.g., touch screen, mouse, keyboard, etc.) of a user interface element presented on a display for starting an enrollment process. Additionally, the front-end enrollment component 128 may detect a speech utterance from the user 106 indicating a request to enroll (e.g., "please enroll me," "I would like to check out," etc.). Another request example may include the user 106 sliding a user ID card into an I/O interface 134, such as a credit card, driver's license, etc. However, any type of input may be detected as a request by the front-end enrollment component 128.

Upon receiving the request to enroll, the front-end enrollment component 128 may activate or otherwise utilize the microphone(s) 144 to generate audio data 142 representing a speech utterance of the user 106, and may activate or otherwise utilize the imaging device(s) 132 to generate image data 140 representing a face of the user 106. The imaging device(s) 132 may generate image data 140 representing at least a face of the user 106 as they speak the speech utterance.

At "2," the user-recognition device 104 may send the audio data 142 and the image data 140 to the server(s) 108. For instance, the user-recognition device 104 may encode and send the audio data 142 and image data 140 over the network(s) 148 to the server(s) 108.

At "3," the facial-feature extraction component 236 may extract facial-feature data 220 from the image data 140. In some examples, prior to extracting the facial-feature data 220, the facial-feature extraction component 236 may perform various operations for processing the image data 140 prior to extracting the facial-feature data 220. For instance, the facial-feature extraction component 236 may initially perform face detection to determine that the image data 140 represents a face of a user 106. For instance, the facial-feature extraction component 236 may utilize an Integrated Sensor Processor (ISP) that performs hardware-based face detection techniques. In some examples, various software techniques may additionally, or alternatively be performed. In either instance, a bounding box may be output around the detected face of the user 106 for an image depicting the user 106 and represented by the image data 140. Further, the facial-feature extraction component 236 may perform face pose estimation in order to align the face of the user 106 with a common coordinate system. In some examples, face pose estimation may improve the extraction of features representing the face of the user 106. Once the face of the user 106 has been aligned, the facial-feature extraction component 236 may extract features (e.g., facial-feature data 220, lip-movement/utterance feature data 220, etc.) from a face image. In some examples, the trained model(s) 234 may utilize a triples loss function which converts a face image data 140 into a feature embedding in a metric space (e.g., facial-feature data 220), which may allow for comparisons with subsequent feature vectors using, for example, squared distance calculation.

At "4," the facial-feature aggregation component 238 may aggregate feature data (e.g., facial-feature data 220, lip-movement/utterance feature data 220, etc.) from various image data 140. For instance, the image data 140 may represent the user 106 at different angles, under different lighting conditions, or other differing characteristics. The facial-feature aggregation component 238 may aggregate the facial-feature data 220 together and/or the lip-movement/utterance feature data 220 together, such as by averaging out feature vectors.

At "5", the relative-transfer-function component 256 may receive the audio data an applying the appropriate relative transfer function to the enrollment audio signal. For instance, the relative-transfer-function component 256 may determine device type and/or microphone type of the device that generated the audio data, may access the relative-transfer-function database 224 to determine the appropriate relative transfer function, and may apply this relative transfer function to the audio data to generate modified audio data 502. While the illustrated example of FIGS. 6-7 discuss instances where a relative transfer function is applied to enrollment audio data, it is again noted that the relative transfer functions may instead be applied additionally or alternatively to the recognition audio data generated by the user-recognition devices at the time of recognition, as described throughout.

At "6," the lip-movement/utterance extraction component 240 may determine lip-movement/utterance feature data 220. In some examples, the lip-movement/utterance feature data 220 may receive, from the facial-feature extraction component 236, mouth crop sequence that is utilized for voice-to-lip movement association. For instance, the facial-feature extraction component 236 may track and associate faces across various frames represented by the image data 140 to collect a sequence of faces for the user 106. The facial-feature extraction component 236 may create a tracking for the face of the user 106 through the sequence of frames, and utilize that to crop out the mouth/lip movement of the user 106 represented in the sequence. The lip-movement/utterance extraction component 240 may receive this mouth-crop sequence from the facial-feature extraction component 236, and utilize that to help determine the lip-movement/utterance feature data 220.

In some examples, the lip-movement/utterance extraction component 240 may initially analyze the modified audio data 606 in order to identify a portion of the audio data 606 where the speech utterance is represented. For instance, the lip-movement/utterance extraction component 240 may identify signal-energy measurements that correspond to a speech utterance of the user 106, such as by analyzing the audio data 142 to identify frequency components using a transform, such as a Fourier Transform (e.g., Fast Fourier Transform, discrete Fourier Transforms, etc.), Hartley Transform, Fourier Series, Laplace transforms, Z transforms, etc. The lip-movement/utterance extraction component 240 may then correlate segments of the audio data 606 that represents the speech utterance with respective segments of the mouth-crop sequence from the image data 140 that represents lip movement of the user 106 while speaking the speech utterance. As a specific example, the lip-movement/utterance extraction component 240 may capture roughly 2 seconds of image data 140 where each second captures 30 frames per second. Thus, the image data 140 may represent roughly 60 frames that depict the user 106 speaking the speech utterance. The lip-movement/utterance extraction component 240 may (e.g., utilizing a trained model(s) 234) chunk up the audio data 606 into 60 segments or portions, and correlate each chunk of the audio data 142 with the corresponding frame in the image data 140, and in this way, generate, identify, or otherwise determine the lip-movement/utterance feature data 220. The lip-movement/utterance feature data 220 may comprise any representation of the data, such as a three-dimensional volumetric model, a feature vector, etc.

At "7," the ASR component 244 may determine text data 222 for the speech utterance. For instance, the ASR component 244 may transcribe the words of the speech utterance into corresponding text data 222 including textual representations of the words in the speech utterance.

At "8," the quality-check component 258 may perform a quality check on at least one of the facial-feature data and/or the lip-movement utterance feature data 220. For example, the quality-check component 258 may utilize a trained model(s) 234 to determine an overall metric of how good the extracted facial-feature data 220 is, and/or an overall metric of how good the extracted lip-movement/utterance feature data 222 is. If the overall metrics are poor, or below a threshold quality level, the user-recognition system may need to acquire additional image data 140 and/or audio data 142. If the overall metrics are good or acceptable, the backend enrollment component 214 may aggregate the data at "9."

For example, at "9" the backend-enrollment component 214 may aggregate the facial-feature data 220 and/or lip-movement feature data 220, and enroll the user at "10" in the enrollment database 226. The backend-enrollment component 214 may store associations (e.g., mappings) between one, or all, of the data (e.g., 220 and 222) determined using the different modalities with a user profile 228 of the user 106 requesting to be enrolled for use of the user-recognition system. Stated otherwise, the backend-enrollment system may store associations in the enrollment database 226 between the facial-feature data 220 representing the face of the user 106, the lip-movement/utterance feature data 220 representing the user's lip movement and speech utterance, and the text data 222 representing words of the speech utterance, with a user profile 228 of the user 106.

Figure 7:
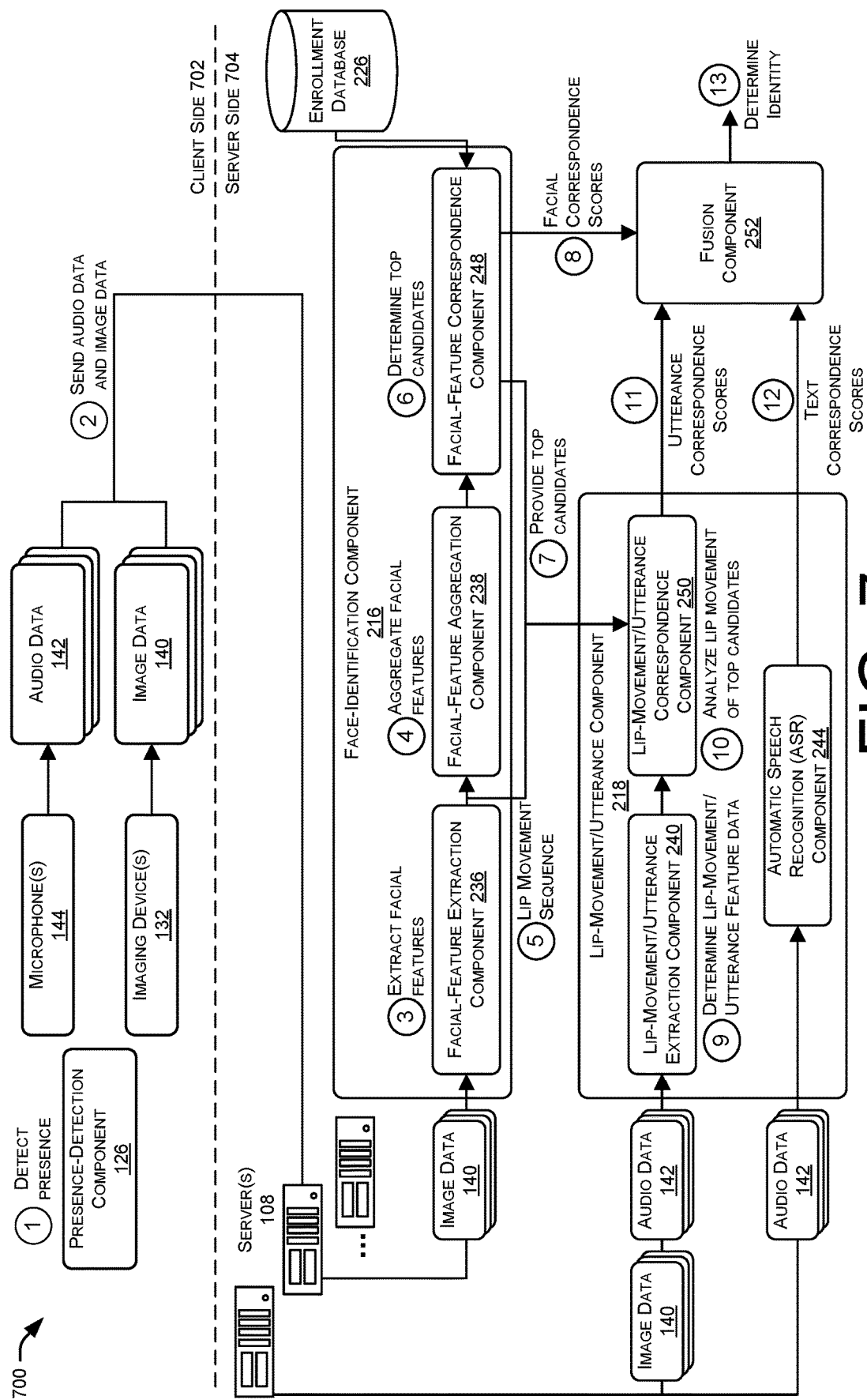
FIG. 7 illustrates an example environment including a block diagram of one or more servers configured to support at least a portion of the functionality of a user-recognition system, as well as an example flow of data within the system for identifying a user of the user-recognition system.

FIG. 7 illustrates an example environment 700 including a block diagram of one or more servers 108 configured to support at least a portion of the functionality of a user-recognition system, as well as an example flow of data within the system for identifying a user 106 of the user-recognition system.

As illustrated, the environment 700 includes a client side 702 and a server side 704. However, this is merely illustrative, and some or all of the techniques may be performed entirely on the client side 702, or entirely on the server side 704.

At "1," the presence-detection component 126 may be executable by the processor(s) 122 to detect a trigger indicating presence of the user 106. The trigger detected by the presence-detection component 126 may comprise one or more different types of input. For instance, the presence-detection component 126 may include logic to detect, using one or more imaging devices 132, a face of a user 106. Other examples of triggers detected by the presence-detection component 126 that may indicate the presence of the user

106 may include receiving touch input (or other input, such as a mouse click) via one or more I/O interfaces 134 of the user-recognition device 104. However, any type of input may be detected as a trigger by the presence-detection component 126.

As illustrated, one or more microphones of a user-recognition device 104 may generate audio data 142 representing a speech utterance of a user 106 that wishes to be identified by a user-recognition system in which the user 106 is enrolled. Further, one or more imaging devices 132 may generate image data 140 representing at least a face of the user 106 as they speak the speech utterance.

At "2," the user-recognition device 104 may send the audio data 142 and the image data 140 to the server(s) 108. For instance, the user-recognition device 104 may encode and send the audio data 142 and image data 140 over the network(s) 148 to the server(s) 108.

At "3," the facial-feature extraction component 236 may extract facial-feature data 220 from the image data 140. In some examples, prior to extracting the facial-feature data 220, the facial-feature extraction component 236 may perform various operations for processing the image data 140 prior to extracting the facial-feature data 220. For instance, the facial-feature extraction component 236 may initially perform face detection to determine that the image data 140 represents a face of a user 106. For instance, the facial-feature extraction component 236 may utilize an Integrated Sensor Processor (ISP) that performs hardware-based face detection techniques. In some examples, various software techniques may additionally, or alternatively be performed. In either instance, a bounding box may be output around the detected face of the user 106 for an image depicting the user 106 and represented by the image data 140. Further, the facial-feature extraction component 236 may perform face pose estimation in order to align the face of the user 106 with a common coordinate system. In some examples, face pose estimation may improve the extraction of features representing the face of the user 106. Once the face of the user 106 has been aligned, the facial-feature extraction component 236 may extract features (e.g., facial-feature data 220, lip-movement/utterance feature data 220, etc.) from a face image. In some examples, the trained model(s) 234 may utilize a triples loss function which converts a face image data 140 into a feature embedding in a metric space (e.g., facial-feature data 220), which may allow for comparisons with subsequent feature vectors using, for example, squared distance calculation.

At "4," the facial-feature aggregation component 240 may aggregate feature data (e.g., facial-feature data 220, lip-movement/utterance feature data 220, etc.) from various image data 140. For instance, the image data 140 may represent the user 106 at different angles, under different lighting conditions, or other differing characteristics. The facial-feature aggregation component 238 may aggregate the facial-feature data 220 together and/or the lip-movement/utterance feature data 220 together, such as by averaging out feature vectors.

At "5," the face-identification component 216 may provide a lip-movement sequence to the lip-movement component 220. The lip-movement sequence may comprise the lip-movement feature data 220 that represents how the lips of the user 106 move while speaking the speech utterance.

At "6," the facial-feature correspondence component 248 may determine top candidates from the enrollment database 226. For example, the facial-feature correspondence component 248 may compare the extracted facial-feature data 220 with facial-feature data 220 of the top candidates to determine one or more candidates (e.g., user profiles/profiles 228) from the enrollment database 226 that correspond to the extracted facial-feature data 220. In some examples, the facial-feature correspondence component 248 may simply receive an indication of one user profile 228 that corresponds to the facial-feature data 220. In other examples, the facial-feature correspondence component 248 may receive a group of user profiles 228 that each are associated with respective facial-feature data 220 that corresponds to the facial-feature data 220 of the user 106 that was extracted from the received image data 140. For instance, the facial-feature correspondence component 248 may determine that multiple user profiles 228 are associated with respective facial-feature data 220 that corresponds to the extracted facial-feature data 220 by more than a threshold amount (e.g., more than 70%, more than 80%, etc.). In some examples, the facial-feature correspondence component 248 may simply determine a group of the top "N" user profiles 228 by their strength of correspondence to the input facial-feature data 220 using the trained model(s) 234.

At "7," the facial-feature correspondence component 248 may provide an indication of the top candidates, or the top user profiles 228, to the lip-movement/utterance correspondence component 250. For instance, the facial-feature correspondence component 248 may indicate which user profiles 228 are associated with facial-feature data 220 that corresponds to the input facial-feature data 220. At "8," the facial-feature correspondence component 248 may provide facial correspondence scores to the fusion component 252. In some examples, the facial-correspondence scores may indicate how strongly correlated the extracted facial-feature data 220 is with the respective facial-feature data 220 of the user profiles 228. For instance, the scores may be percentages determined by the facial-feature correspondence component 248 indicating how correlated the facial-feature data 220 is between the extracted data 220 and the stored data 220 for each of the user profiles 228. In some examples, the correspondence scores may be determined, at least in part, on a "distance" between the feature vectors of the respective facial-feature data 220 as determined by the facial-feature correspondence component 248.

At "9," the lip-movement/utterance extraction component 240 may determine lip-movement/utterance feature data 220. In some examples, the lip-movement/utterance feature data 220 may receive, from the facial-feature extraction component 236, mouth crop sequence that is utilized for voice-to-lip movement association. For instance, the facial-feature extraction component 236 may track and associate faces across various frames represented by the image data 140 to collect a sequence of faces for the user 106. The facial-feature extraction component 236 may create a tracking for the face of the user 106 through the sequence of frames, and utilize that to crop out the mouth/lip movement of the user 106 represented in the sequence. The lip-movement/utterance extraction component 240 may receive this mouth-crop sequence from the facial-feature extraction component 236, and utilize that to help determine the lip-movement/utterance feature data 220.

At "10," the lip-movement/utterance correspondence component 250 may analyze data associated with the lip-movement/utterance feature data 220 of the top candidate user profiles 228. In some examples, the lip-movement component 220 may perform operations to determine how well synchronized the speech utterance represented in the audio data 142 is with the lip movement in the lip-movement/utterance feature data 220 for each of the top candidate user profiles 228. The lip-movement/utterance feature data 220 may utilize various techniques for matching lip movements with different sounds made by a user 106. Further, the lip-movement/utterance correspondence component 250 may determine timing correlations between the different sounds in the audio data 142 representing the speech utterance with the lip-movements represented in the lip-movement/utterance feature data 220. The lip-movement/utterance correspondence component 250 may be configured to determine a correspondence score that indicates how strongly synchronized the speech utterance represented in the audio data 142 is with the lip movements represented in the lip-movement/utterance feature data 220 associated with each of the user profiles/profiles 228. The correspondence scores may be based on an amount of time that the speech utterance in the audio data 142 corresponds to the lip movement represented in the lip-movement/utterance feature data 220 associated with each of the top candidate user profiles 228.

At "11," the lip-movement/utterance correspondence component 220 may provide utterance correspondence scores to the fusion component 252. In some examples, the lip-movement/utterance correspondence component 220 may provide utterance correspondence scores that indicate how strongly (e.g., how much time) the lip-movement/utterance feature data 220 determined for the received audio data 142 and video data 110 corresponds to the lip-movement/utterance feature data 220 for each of the user profiles 228. For example, when comparing vectors representing the determined lip-movement/utterance feature data 220 with respective lip-movement/utterance feature data 220 for each of the user profiles 228, the closer the "distance" between the vectors, the higher the utterance correspondence scores.

At "12," the ASR component 244 may determine text data 222 for the speech utterance. For instance, the ASR component 244 may transcribe the words of the speech utterance into corresponding text data 222 including textual representations of the words in the speech utterance. Further, the ASR component 244 may compare the text data 222 with respective text data 222 for each of the top candidate user profiles 228 to determine how correlated, or a strength of correspondence, between the respective text data 222. For instance, the ASR component 244 may measure how many words and/or letters correspond between the text data 222 of the input audio data 142 and the text data 222 for each of the user profiles 228.

At "13," the fusion component 252 may determine an identity (e.g., a user profile 228) from amongst the top candidate user profiles 228. The fusion component 252 may use one or all of the different scores provided, such as the facial correspondence scores, the utterance correspondence scores, and/or the text correspondence scores. In some examples, the fusion component 252 may simply select an identity or user profile 228 with the higher score from one of those modalities, e.g., the facial correspondence scores, the utterance correspondence scores, or the text correspondence scores. In other examples, fusion component 252 may utilize two or more of the scores to select or determine an identity or user profile 228. For example, the fusion component 252 may average out two or more of the facial correspondence scores, the utterance correspondence scores, or the text correspondence scores and select the user profile 228 with the highest average. In some examples, the fusion component 252 may apply weighting factors to one or more of the scores based on how heavily weighted the user-recognition system would like to weight a respective score. For instance, the facial correspondence score may be weighted more heavily than the text correspondence score, and have a larger weighted factor applied to it (e.g., no weighting factor). In some examples, the fusion component 252 may determine that only user profiles 228 that have scores for each modality that are higher than a threshold amount may be considered. For instance, the fusion component 252 may perform AND fusion techniques where a user profile 228 is only selected if it has scores in each of the modalities, e.g., facial correspondence scores, the utterance correspondence scores, and the text correspondence scores. However, the fusion component 252 may determine or select an identity/user profile 228 according to any techniques, and utilizing any of the scores and/or data described herein.

Figure 8:
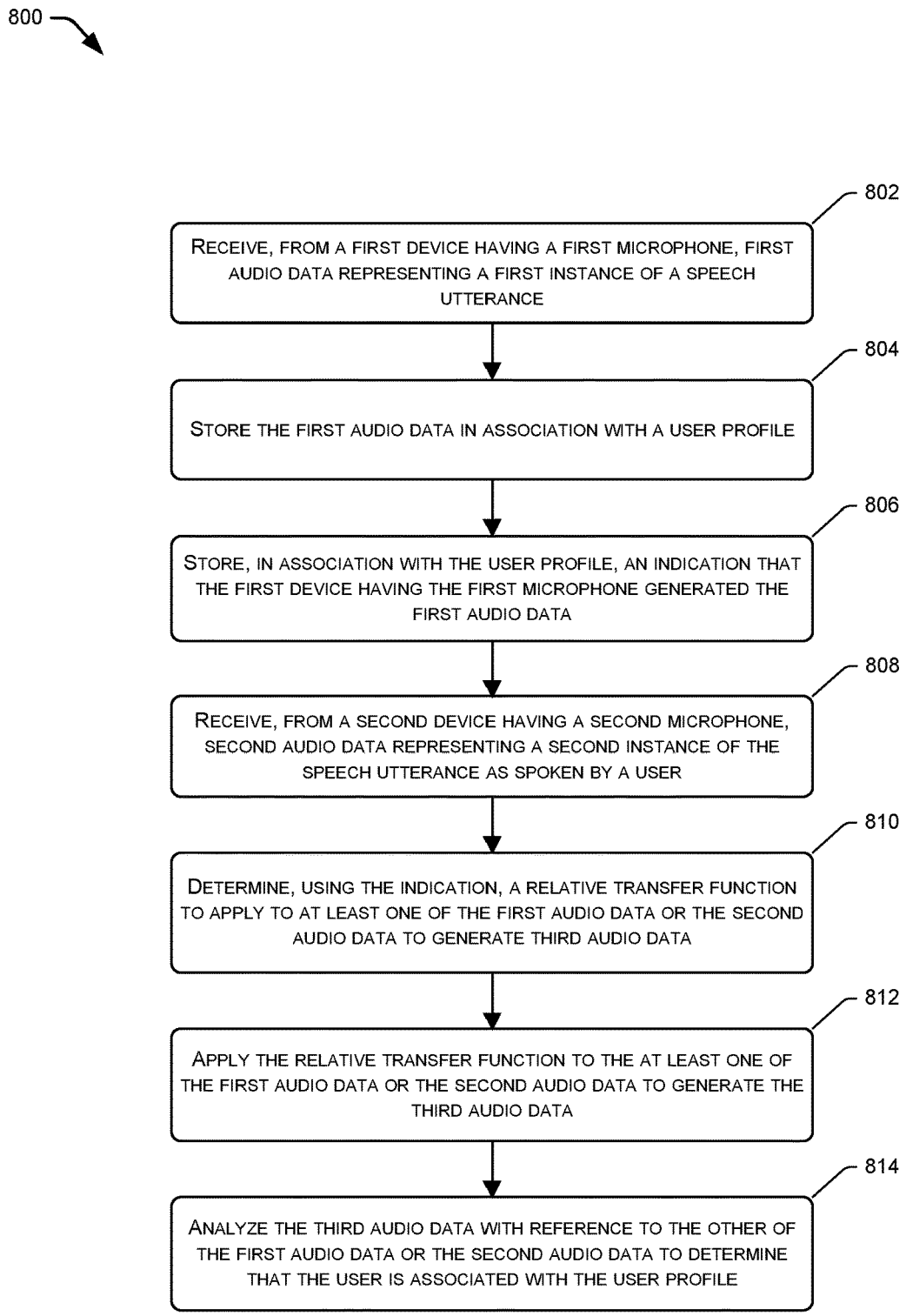
FIG. 8 illustrates a flow diagram of an example process for enrolling a user in a user-recognition system and thereafter identifying the user using audio data.

FIG. 8 illustrates a flow diagram of an example process 800 for enrolling a user in a user-recognition system and thereafter identifying the user using audio data. At 802, a user-recognition system may receive, from a first device having a first microphone, first audio data representing a first instance of a speech utterance. For example, the user-recognition system may receive the first audio data from a client device, a user-recognition device at a facility 102, or the like. In some instances, the first audio data comprises enrollment audio data for enrolling a user with the user-recognition system.

At 804, the user-recognition system may store the first audio data in association with a profile of the user that spoke the speech utterance. Further, at 806, the user-recognition system may store, in association with the user profile, an indication that that the first device having the first microphone generated the first audio data. In some instances, the user-recognition system stores an indication of the device, which may be used or may have been previously used to determine the first microphone. In other instances, the user-recognition system stores an identification of the first microphone itself.

In either instance, at 808, the user-recognition system may receive, from a second device having a second microphone, second audio data representing a second instance of the speech utterance. For example, the second audio data may comprise audio data spoken to a user-recognition device at a facility when a user was entering and/or exiting the facility. At 810, the user-recognition system may determine, using the indication stored in association with the user profile, a relative transfer function to apply to at least one of the first audio data (e.g., the enrollment audio data) or the second audio data (e.g., the recognition audio data). In some instances, the user-recognition system accesses a relative-transfer-function database 224, such as the database 224 discussed above.

At 812, the user-recognition system may apply the determined relative transfer function to the at least one of the first audio data or the second audio data to generate third audio data. At 814, the user-recognition system may analyze the third audio data with reference to the other of the first or second audio data. That is, the user-recognition system may analyze the third audio data with reference to the audio data to which the relative transfer function was not applied. Based on this analysis, the user-recognition system may determine whether the user that spoke the second instance of the speech utterance is the same as the user that spoke the first instance of the speech utterance.

Figure 9:
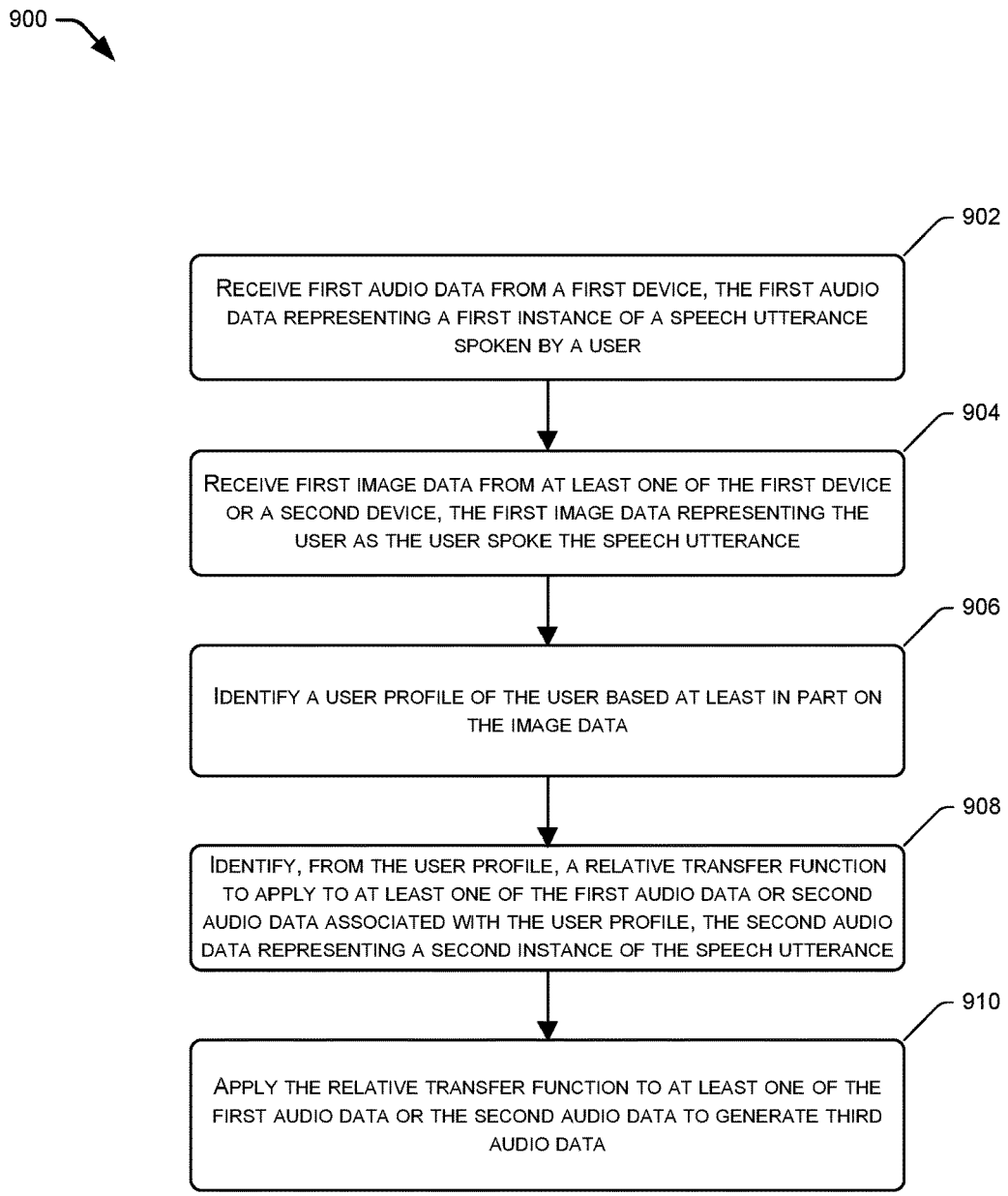
FIG. 9 illustrates a flow diagram of an example process for identifying a user that is enrolled for use of a user-recognition system using image data and audio data.

FIG. 9 illustrates a flow diagram of an example process 900 for identifying a user that is enrolled for use of a user-recognition system using image data and audio data. At 902, the user-recognition system may receive first audio data from a first device, the first audio data representing a first instance of a speech utterance. At 904, the user-recognition system may also receive first image data from at least one of the first device or a second device that is proximate the first device. In some instances, the first image data comprises video data taken of the user as the user spoke the first instance of the speech utterance.

At 906, the user-recognition system may identify a user profile based at least in part on the image data. For example, the user-recognition system may generate feature data (e.g., facial-feature data, lip-movement/utterance feature data, etc.) from the image data, and may compare this feature data to previously received feature data associated with one or more user profiles. In some instances, based at least in part on the difference between these features being less than a threshold difference, the corresponding user profile may be deemed a candidate user profile. Additionally or alternatively, this comparison may be used to identify the top N candidate user profiles.

After identifying at least one user profile using the image data at 906, at 908 the user-recognition system may identify, from the user profile, a relative transfer function to apply to at least one of the first audio data or to second audio data previously associated with the user profile. The second audio data may represent a second instance of the speech utterance, as previously spoken. Thus, in this example, the second audio data may represent the "enrollment audio data" stored at the time of the user's enrollment, while the first audio data may represent the "recognition audio data" generated by a user-recognition device at a time of recognition.

At 910, the user-recognition system may then apply the relative transfer function to at least one of the first audio data or the second audio data to generate third audio data. For instance, the user-recognition system may apply the relative transfer function to the second audio data to generate modified enrollment audio data, which may be compared to the first audio data to determine whether the user that spoke the first audio data corresponds to the user profile to which the second audio data is associated. Or, the relative transfer function may be applied to the first audio to generate modified recognition audio data, which may be compared to the second audio data, again potentially for the purpose of determine whether the user that spoke the first audio data corresponds to the user profile to which the second audio data is associated.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet. Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

Figure 10:
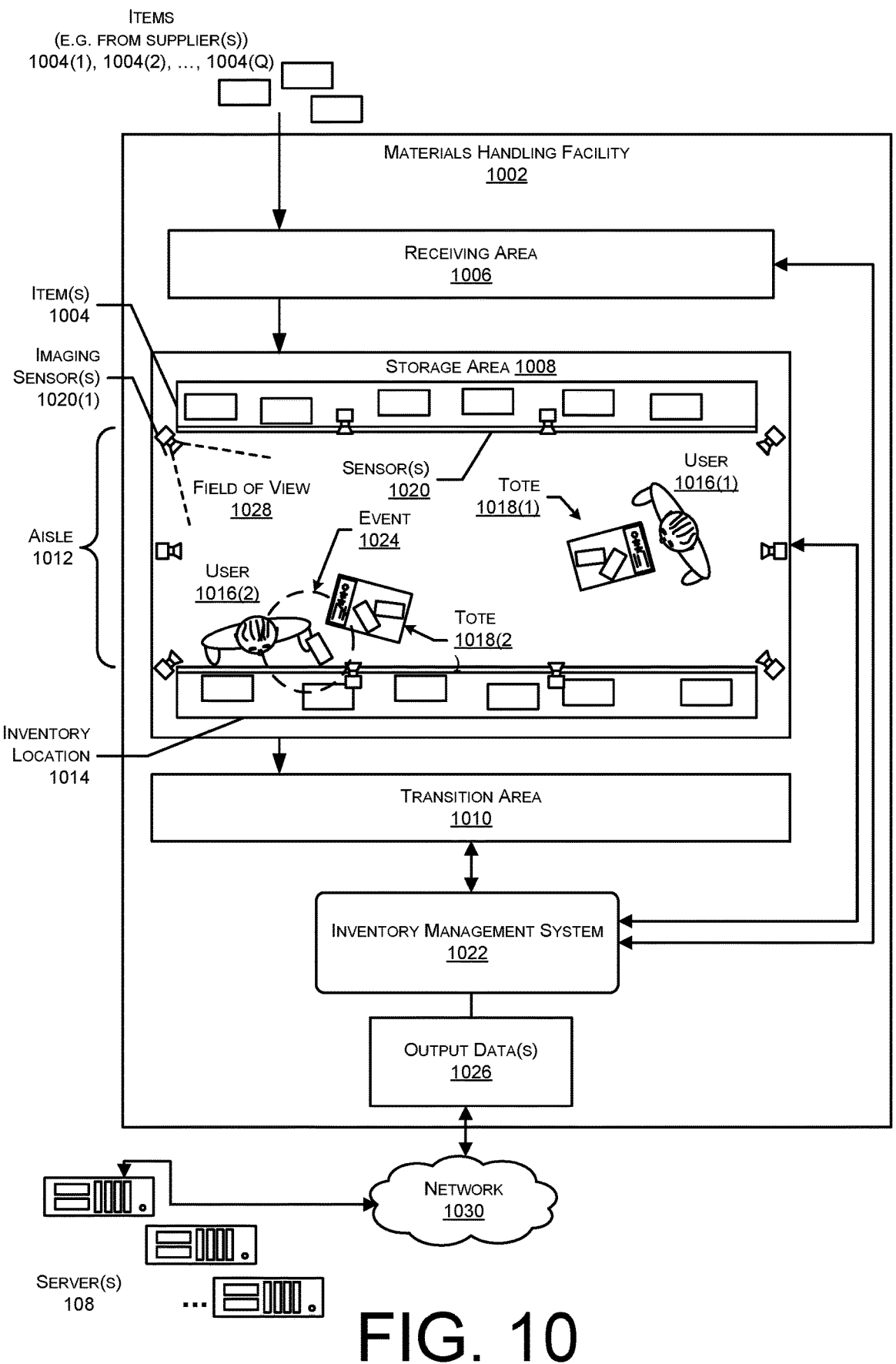
FIG. 10 is a block diagram of an example materials handling facility that includes sensors and an inventory management system configured to generate output regarding events occurring in the facility using the sensor data.
Figure 11:
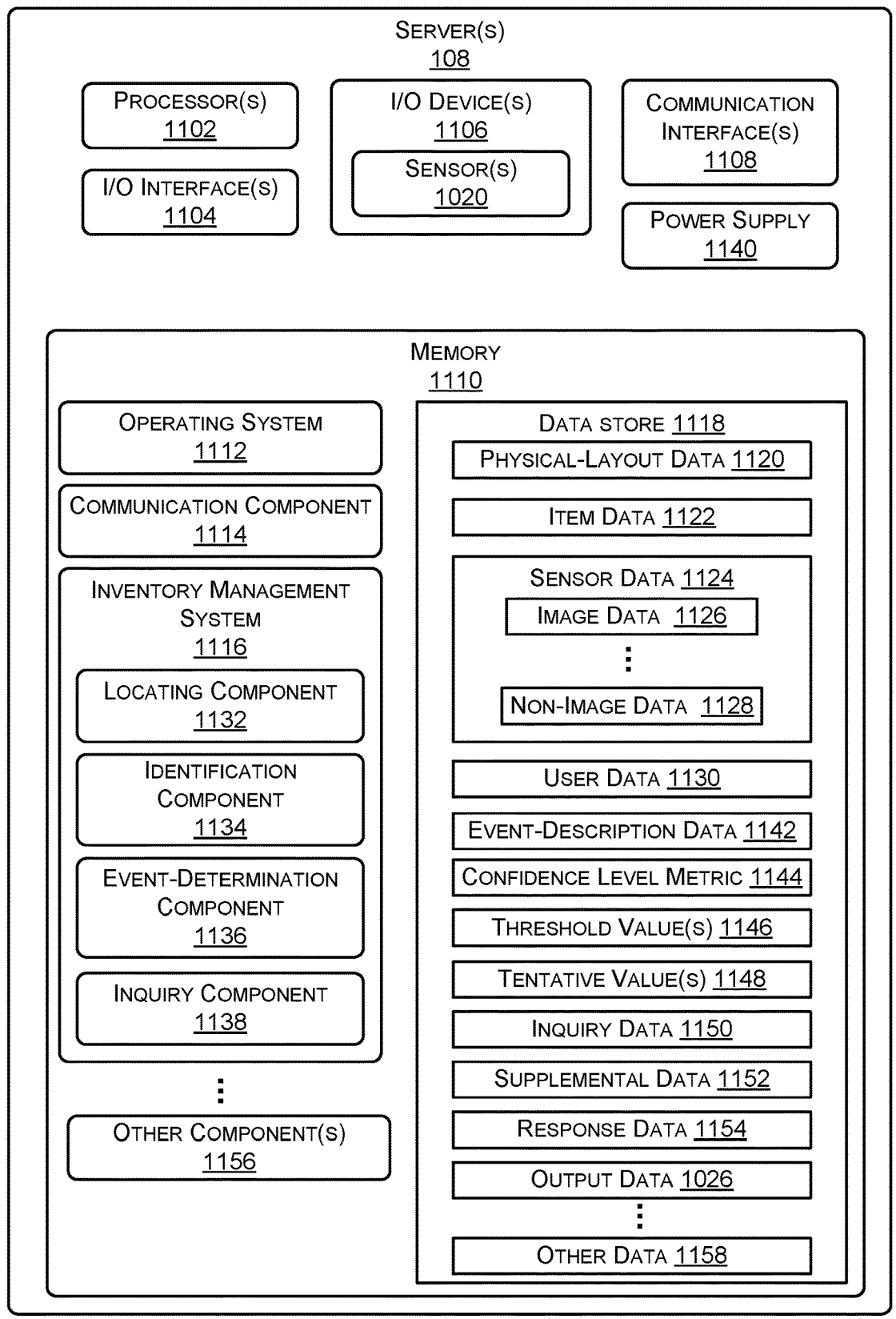
FIG. 11 illustrates a block diagram of one or more servers configured to support operation of the facility.

FIGS. 10 and 11 represent an illustrative materials handling environment, such as the materials handling facility 102, in which the techniques described herein may be applied to cameras monitoring the environments as described below. However, the following description is merely one illustrative example of an industry and environment in which the techniques described herein may be utilized.

An implementation of a materials handling facility 1002 (e.g., facility 102) configured to store and manage inventory items is illustrated in FIG. 10. A materials handling facility 1002 (facility) comprises one or more physical structures or areas within which one or more items 1004(1), 1004(2), . . . , 1004(Q) (generally denoted as 1004) may be held. As used in this disclosure, letters in parenthesis such as "(Q)" indicate an integer result. The items 1004 comprise physical goods, such as books, pharmaceuticals, repair parts, electronic gear, groceries, and so forth.

The facility 1002 may include one or more areas designated for different functions with regard to inventory handling. In this illustration, the facility 1002 includes a receiving area 1006, a storage area 1008, and a transition area 1010. The receiving area 1006 may be configured to accept items 1004, such as from suppliers, for intake into the facility 1002. For example, the receiving area 1006 may include a loading dock at which trucks or other freight conveyances unload the items 1004.

The storage area 1008 is configured to store the items 1004. The storage area 1008 may be arranged in various physical configurations. In one implementation, the storage area 1008 may include one or more aisles 1012. The aisle 1012 may be configured with, or defined by, inventory locations 1014 on one or both sides of the aisle 1012. The inventory locations 1014 may include one or more of shelves, racks, cases, cabinets, bins, floor locations, or other suitable storage mechanisms for holding or storing the items 1004. The inventory locations 1014 may be affixed to the floor or another portion of the facility's structure, or may be movable such that the arrangements of aisles 1012 may be reconfigurable. In some implementations, the inventory locations 1014 may be configured to move independently of an outside operator. For example, the inventory locations 1014 may comprise a rack with a power source and a motor, operable by a computing device to allow the rack to move from one location within the facility 1002 to another.

One or more users 1016(1), 1016(2), . . . , 1016(U), totes 1018(1), 1018(2), . . . , 1018(T) (generally denoted as 1018) or other material handling apparatus may move within the facility 1002. For example, the users 1016 may move about within the facility 1002 to pick or place the items 1004 in various inventory locations 1014, placing them on the totes 1018 for ease of transport. An individual tote 1018 is configured to carry or otherwise transport one or more items 1004. For example, a tote 1018 may include a basket, a cart, a bag, and so forth. In other implementations, other agencies such as robots, forklifts, cranes, aerial drones, and so forth, may move about the facility 1002 picking, placing, or otherwise moving the items 1004.

One or more sensors 1020 may be configured to acquire information in the facility 1002. The sensors 1020 in the facility 1002 may include sensors fixed in the environment (e.g., ceiling-mounted cameras) or otherwise, such as sensors in the possession of users (e.g., mobile phones, tablets, etc.). The sensors 1020 may include, but are not limited to, cameras 1020(1), weight sensors, radio frequency (RF) receivers, temperature sensors, humidity sensors, vibration sensors, and so forth. The sensors 1020 may be stationary or mobile, relative to the facility 1002. For example, the inventory locations 1014 may contain cameras 1020(1) configured to acquire images of pick or placement of items 1004 on shelves, of the users 1016(1) and 1016(2) in the facility 1002, and so forth. In another example, the floor of the facility 1002 may include weight sensors configured to determine a weight of the users 1016 or other object thereupon.

During operation of the facility 1002, the sensors 1020 may be configured to provide information suitable for identifying new locations of objects or other occurrences within the facility 1002. For example, a series of images acquired by a camera 1020(1) may indicate removal of an item 1004 from a particular inventory location 1014 by one of the users 1016 and placement of the item 1004 on or at least partially within one of the totes 1018.

While the storage area 1008 is depicted as having one or more aisles 1012, inventory locations 1014 storing the items 1004, sensors 1020, and so forth, it is understood that the receiving area 1006, the transition area 1010, or other areas of the facility 1002 may be similarly equipped. Furthermore, the arrangement of the various areas within the facility 1002 is depicted functionally rather than schematically. For example, multiple different receiving areas 1006, storage areas 1008, and transition areas 1010 may be interspersed rather than segregated in the facility 1002.

The facility 1002 may include, or be coupled to, an inventory management system 1022. The inventory management system 1022 is configured to identify interactions with and between users 1016, devices such as sensors 1020, robots, material handling equipment, computing devices, and so forth, in one or more of the receiving area 1006, the storage area 1008, or the transition area 1010. These interactions may include one or more events 1024. For example, events 1024 may include the entry of the user 1016 to the facility 1002, stocking of items 1004 at an inventory location 1014, picking of an item 1004 from an inventory location 1014, returning of an item 1004 to an inventory location 1014, placement of an item 1004 within a tote 1018, movement of users 1016 relative to one another, gestures by the users 1016, and so forth. Other events 1024 involving users 1016 may include the user 1016 providing authentication information in the facility 1002, using a computing device at the facility 1002 to authenticate identity to the inventory management system 1022, and so forth. Some events 1024 may involve one or more other objects within the facility 1002. For example, the event 1024 may comprise movement within the facility 1002 of an inventory location 1014, such as a counter mounted on wheels. Events 1024 may involve one or more of the sensors 1020. For example, a change in operation of a sensor 1020, such as a sensor failure, change in alignment, and so forth, may be designated as an event 1024. Continuing the example, movement of a camera 1020(1) resulting in a change in the orientation of the field of view 1028 (such as resulting from someone or something bumping the camera 1020(1)) (e.g. camera 104) may be designated as an event 1024.

By determining the occurrence of one or more of the events 1024, the inventory management system 1022 may generate output data 1026. The output data 1026 comprises information about the event 1024. For example, where the event 1024 comprises an item 1004 being removed from an inventory location 1014, the output data 1026 may comprise an item identifier indicative of the particular item 1004 that was removed from the inventory location 1014 and a user identifier of a user that removed the item.

The inventory management system 1022 may use one or more automated systems to generate the output data 1026. For example, an artificial neural network, one or more classifiers, or other automated machine learning techniques may be used to process the sensor data from the one or more sensors 1020 to generate output data 1026. The automated systems may operate using probabilistic or non-probabilistic techniques. For example, the automated systems may use a Bayesian network. In another example, the automated systems may use support vector machines to generate the output data 1026 or the tentative results. The automated systems may generate confidence level data that provides information indicative of the accuracy or confidence that the output data 1026 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 135%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 1004, user 1016, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 1016 may pick an item 1004(1) such as a perfume bottle that is generally cubical in shape from the inventory location 1014. Other items 1004 at nearby inventory locations 1014 may be predominately spherical. Based on the difference in shape (cube vs. sphere) from the adjacent items, and the correspondence in shape with the previously stored image of the perfume bottle item 1004(1) (cubical and cubical), the confidence level that the user 106 has picked up the perfume bottle item 1004(1) is high.

In some situations, the automated techniques may be unable to generate output data 1026 with a confidence level above a threshold result. For example, the automated techniques may be unable to distinguish which user 1016 in a crowd of users 1016 has picked up the item 1004 from the inventory location 1014. In other situations, it may be desirable to provide human confirmation of the event 1024 or of the accuracy of the output data 1026. For example, some items 1004 may be deemed age restricted such that they are to be handled only by users 1016 above a minimum age threshold.

In instances where human confirmation is desired, sensor data associated with an event 1024 may be processed to generate inquiry data. The inquiry data may include a subset of the sensor data associated with the event 1024. The inquiry data may also include one or more of one or more tentative results as determined by the automated techniques, or supplemental data. The subset of the sensor data may be determined using information about the one or more sensors 1020. For example, camera data such as the location of the camera 1020(1) within the facility 1002, the orientation of the camera 1020(1), and a field of view 1028 of the camera 1020(1) may be used to determine if a particular location within the facility 1002 is within the field of view 1028. The subset of the sensor data may include images that may show the inventory location 1014 or that the item 1004 was stowed. The subset of the sensor data may also omit images from other cameras 1020(1) that did not have that inventory location 1014 in the field of view 1028. The field of view 1028 may comprise a portion of the scene in the facility 1002 that the sensor 1020 is able to generate sensor data about.

Continuing the example, the subset of the sensor data may comprise a video clip acquired by one or more cameras 1020(1) having a field of view 1028 that includes the item 1004. The tentative results may comprise the "best guess" as to which items 1004 may have been involved in the event 1024. For example, the tentative results may comprise results determined by the automated system that have a confidence level above a minimum threshold.

The facility 1002 may be configured to receive different kinds of items 1004 from various suppliers and to store them until a customer orders or retrieves one or more of the items 1004. A general flow of items 1004 through the facility 1002 is indicated by the arrows of FIG. 10. Specifically, as illustrated in this example, items 1004 may be received from one or more suppliers, such as manufacturers, distributors, wholesalers, and so forth, at the receiving area 1006. In various implementations, the items 1004 may include merchandise, commodities, perishables, or any suitable type of item 1004, depending on the nature of the enterprise that operates the facility 1002. The receiving of the items 1004 may comprise one or more events 1024 for which the inventory management system 1022 may generate output data 1026.

Upon being received from a supplier at receiving area 1006, the items 1004 may be prepared for storage. For example, items 1004 may be unpacked or otherwise rearranged. The inventory management system 1022 may include one or more software applications executing on a computer system to provide inventory management functions based on the events 1024 associated with the unpacking or rearrangement. These inventory management functions may include maintaining information indicative of the type, quantity, condition, cost, location, weight, or any other suitable parameters with respect to the items 1004. The items 1004 may be stocked, managed, or dispensed in terms of countable, individual units or multiples, such as packages, cartons, crates, pallets, or other suitable aggregations. Alternatively, some items 1004, such as bulk products, commodities, and so forth, may be stored in continuous or arbitrarily divisible amounts that may not be inherently organized into countable units. Such items 1004 may be managed in terms of measurable quantity such as units of length, area, volume, weight, time, duration, or other dimensional properties characterized by units of measurement. Generally speaking, a quantity of an item 1004 may refer to either a countable number of individual or aggregate units of an item 1004 or a measurable amount of an item 1004, as appropriate.

After arriving through the receiving area 1006, items 1004 may be stored within the storage area 1008. In some implementations, like items 1004 may be stored or displayed together in the inventory locations 1014 such as in bins, on shelves, hanging from pegboards, and so forth. In this implementation, all items 1004 of a given kind are stored in one inventory location 1014. In other implementations, like items 1004 may be stored in different inventory locations 1014. For example, to optimize retrieval of certain items 1004 having frequent turnover within a large physical facility 1002, those items 1004 may be stored in several different inventory locations 1014 to reduce congestion that might occur at a single inventory location 1014. Storage of the items 1004 and their respective inventory locations 1014 may comprise one or more events 1024.

When a customer order specifying one or more items 1004 is received, or as a user 1016 progresses through the facility 1002, the corresponding items 1004 may be selected or "picked" from the inventory locations 1014 containing those items 1004. In various implementations, item picking may range from manual to completely automated picking. For example, in one implementation, a user 1016 may have a list of items 1004 they desire and may progress through the facility 1002 picking items 1004 from inventory locations 1014 within the storage area 1008, and placing those items 1004 into a tote 1018. In other implementations, employees of the facility 1002 may pick items 1004 using written or electronic pick lists derived from customer orders. These picked items 1004 may be placed into the tote 1018 as the employee progresses through the facility 1002. Picking may comprise one or more events 1024, such as the user 1016 in moving to the inventory location 1014, retrieval of the item 1004 from the inventory location 1014, and so forth.

After items 1004 have been picked, they may be processed at a transition area 1010. The transition area 1010 may be any designated area within the facility 1002 where items 1004 are transitioned from one location to another or from one entity to another. For example, the transition area 1010 may be a packing station within the facility 1002. When the item 1004 arrives at the transition area 1010, the items 1004 may be transitioned from the storage area 1008 to the packing station. The transitioning may comprise one or more events 1024. Information about the transition may be maintained by the inventory management system 1022 using the output data 1026 associated with those events 1024.

In another example, if the items 1004 are departing the facility 1002 a list of the items 1004 may be obtained and used by the inventory management system 1022 to transition responsibility for, or custody of, the items 1004 from the facility 1002 to another entity. For example, a carrier may accept the items 1004 for transport with that carrier accepting responsibility for the items 1004 indicated in the list. In another example, a customer may purchase or rent the items 1004 and remove the items 1004 from the facility 1002. The purchase or rental may comprise one or more events 1024.

The inventory management system 1022 may access or generate sensor data about the facility 1002 and the contents therein including the items 1004, the users 1016, the totes 1018, and so forth. The sensor data may be acquired by one or more of the sensors 1020, data provided by other systems, and so forth. For example, the sensors 1020 may include cameras 1020(1) configured to acquire image data of scenes in the facility 1002. The image data may comprise still images, video, or a combination thereof. The image data may be processed by the inventory management system 1022 to determine a location of the user 1016, the tote 1018, the identity of the user 1016, and so forth. As used herein, the identity of the user may represent a unique identifier of the user (e.g., name, number associated with user, username, etc.), an identifier that distinguishes the user amongst other users being identified with the environment, or the like.

The inventory management system 1022, or systems coupled thereto, may be configured to identify the user 1016, as well as to determine other candidate users. In one implementation, this determination may comprise comparing sensor data with previously stored identity data. For example, the user 1016 may be identified by showing their face to a facial recognition system, by presenting a token carrying authentication credentials, providing a fingerprint, scanning a barcode or other type of unique identifier upon entering the facility, and so forth. Identity of the user 1016 may be determined before, during, or after entry to the facility 1002. Determination of the user's 1016 identity may comprise comparing sensor data associated with the user 1016 in the facility 1002 to previously stored user data.

In some instances, the inventory management system group users within the facility into respective sessions. That is, the inventory management system 1022 may utilize the sensor data to determine groups of users that are effectively "together" (e.g., shopping together). In some instances, a particular session may include multiple users that entered the facility 1002 together and, potentially, that navigate the facility together. For example, when a family of two adults and two children enter the facility together, the inventory management system may associate each user with a particular session. Locating sessions in addition to individual users may help in determining the outcome of individual events, given that users within a session may not only individually pick or return or otherwise interact with items, but may also pass the items back and forth amongst each other. For instance, a child in the above example may pick the box of cereal before handing the box to her mother, who may place it in her tote 1018. Noting the child and the mother as belonging to the same session may increase the chances of successfully adding the box of cereal to the virtual shopping cart of the mother.

By determining the occurrence of one or more events 1024 and the output data 1026 associated therewith, the inventory management system 1022 is able to provide one or more services to the users 1016 of the facility 1002. By utilizing one or more human associates to process inquiry data and generate response data that may then be used to produce output data 1026, overall accuracy of the system may be enhanced. The enhanced accuracy may improve the user experience of the one or more users 1016 of the facility 1002. In some examples, the output data 1026 may be transmitted over a network 1030 to one or more servers 108.

FIG. 11 illustrates a block diagram of the one or more servers 108. The servers 108 may be physically present at the facility 1002, may be accessible by the network 1030, or a combination of both. The servers 108 do not require end-user knowledge of the physical location and configuration of the system that delivers the services. Common expressions associated with the servers 108 may include "on-demand computing," "software as a service (SaaS)," "cloud services," "data centers," and so forth. Services provided by the servers 108 may be distributed across one or more physical or virtual devices.

The servers 108 may include one or more hardware processors 1102 (processors) configured to execute one or more stored instructions. The processors 1102 may comprise one or more cores. The servers 108 may include one or more input/output (I/O) interface(s) 1104 to allow the processor 1102 or other portions of the servers 108 to communicate with other devices. The I/O interfaces 1104 may comprise Inter-Integrated Circuit (I2C), Serial Peripheral Interface bus (SPI), Universal Serial Bus (USB) as promulgated by the USB Implementers Forum, and so forth.

The servers 108 may also include one or more communication interfaces 1108. The communication interfaces 1108 are configured to provide communications between the servers 108 and input/output devices 1106, such as the sensors 1020, the interface devices, routers, and so forth. The communication interfaces 1108 may include devices configured to couple to personal area networks (PANs), wired and wireless local area networks (LANs), wired and wireless wide area networks (WANs), and so forth. For example, the communication interfaces 1108 may include devices compatible with Ethernet, Wi-Fi™, and so forth. The servers 108 may also include one or more busses or other internal communications hardware or software that allow for the transfer of data between the various modules and components of the servers 108.

The servers 108 may also include a power supply 1140. The power supply 1140 is configured to provide electrical power suitable for operating the components in the servers 108.

As shown in FIG. 11, the servers 108 includes one or more memories 1110. The memory 1110 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 1110 provides storage of computer-readable instructions, data structures, program modules, and other data for the operation of the servers 108. A few example functional modules are shown stored in the memory 1110, although the same functionality may alternatively be implemented in hardware, firmware, or as a system on a chip (SOC).

The memory 1110 may include at least one operating system (OS) component 1112. The OS component 1112 is configured to manage hardware resource devices such as the I/O interfaces 1104, the communication interfaces 306, and provide various services to applications or components executing on the processors 1102. The OS component 1112 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Wash., USA; and so forth.

One or more of the following components may also be stored in the memory 1110. These components may be executed as foreground applications, background tasks, daemons, and so forth. A communication component 1114 may be configured to establish communications with one or more of the sensors 1020, one or more of the devices used by associates, other servers 108, or other devices. The communications may be authenticated, encrypted, and so forth.

The memory 1110 may store an inventory management system 1116. The inventory management system 1116 is configured to provide the inventory functions as described herein with regard to the inventory management system 1022. For example, the inventory management system 1116 may determine movement of items 1004 in the facility 1002, generate user interface data, and so forth.

The inventory management system 1116 may access information stored in one or more data stores 1118 in the memory 1110. The data store 1118 may use a flat file, database, linked list, tree, executable code, script, or other data structure to store the information. In some implementations, the data store 1118 or a portion of the data store 1118 may be distributed across one or more other devices including other servers 108, network attached storage devices, and so forth.

The data store 1118 may include physical layout data 1120. The physical layout data 1120 provides a mapping of physical locations within the physical layout of devices and objects such as the sensors 1020, inventory locations 1014, and so forth. The physical layout data 1120 may indicate the coordinates within the facility 1002 of an inventory location 1014, sensors 1020 within view of that inventory location 1014, and so forth. For example, the physical layout data 1120 may include camera data comprising one or more of a location within the facility 1002 of a camera 1020(1), orientation of the camera 1020(1), the operational status, and so forth. Continuing example, the physical layout data 1120 may indicate the coordinates of the camera 1020(1), pan and tilt information indicative of a direction that the field of view 1028 is oriented along, whether the camera 1020(1) is operating or malfunctioning, and so forth.

In some implementations, the inventory management system 1116 may access the physical layout data 1120 to determine if a location associated with the event 1024 is within the field of view 1028 of one or more sensors 1020. Continuing the example above, given the location within the facility 1002 of the event 1024 and the camera data, the inventory management system 1116 may determine the cameras 1020(1) that may have generated images of the event 1024.

The item data 1122 comprises information associated with the items 1004. The information may include information indicative of one or more inventory locations 1014 at which one or more of the items 1004 are stored. The item data 1122 may also include order data, SKU or other product identifier, price, quantity on hand, weight, expiration date, images of the ITEM 1004, detail description information, ratings, ranking, and so forth. The inventory management system 1116 may store information associated with inventory management functions in the item data 1122.

The data store 1118 may also include sensor data 1124. The sensor data 1124 comprises information acquired from, or based on, the one or more sensors 1020. For example, the sensor data 1124 may comprise 3D information about an object in the facility 1002. As described above, the sensors 1020 may include a camera 1020(1), which is configured to acquire one or more images. These images may be stored as the image data 1126. The image data 1126 may comprise information descriptive of a plurality of picture elements or pixels.

Non-image data 1128 may comprise information from other sensors 1020, such as input from the microphones 1020, weight sensors 1020, and so forth.

User data 1130 may also be stored in the data store 1118. The user data 1130 may include identity data, information indicative of a profile, purchase history, location data, images of the user 1016, demographic data, and so forth. Individual users 1016 or groups of users 1016 may selectively provide user data 1130 for use by the inventory management system 1022. The individual users 1016 or groups of users 1016 may also authorize collection of the user data 1130 during use of the facility 1002 or access to user data 1130 obtained from other systems. For example, the user 1016 may opt-in to collection of the user data 1130 to receive enhanced services while using the facility 1002.

In some implementations, the user data 1130 may include information designating a user 1016 for special handling. For example, the user data 1130 may indicate that a particular user 1016 has been associated with an increased number of errors with respect to output data 1026. The inventory management system 1116 may be configured to use this information to apply additional scrutiny to the events 1024 associated with this user 1016. For example, events 1024 that include an ITEM 1004 having a cost or result above the threshold amount may be provided to the associates for processing regardless of the determined level of confidence in the output data 1026 as generated by the automated system.

The inventory management system 1116 may include one or more of a locating component 1132, identification component 1134, event determination component 1136, and inquiry component 1138.

The locating component 1132 functions to locate items or users within the environment of the facility to allow the inventory management system 1116 to assign certain events to the correct users. That is, the locating component 1132 may assign unique identifiers to users as they enter the facility and, with the users' consent, may locating the position of the users throughout the facility 1002 over the time they remain in the facility 1002. The locating component 1132 may perform this locating using sensor data 1124, such as the image data 1126. For example, the locating component 1132 may receive the image data 1126 and may use facial-recognition techniques to identify users from the images. After identifying a particular user within the facility, the locating component 1132 may then locating the user within the images as the user moves throughout the facility 1002. Further, should the locating component 1132 temporarily "lose" a particular user, the locating component 1132 may again attempt to identify the users within the facility based on facial recognition, and/or using other techniques such as voice recognition, or the like.

Therefore, upon receiving the indication of the time and location of the event in question, the locating component 1132 may query the data store 1118 to determine which one or more users were at or within a threshold distance of the location of the event at the particular time of the event. Further, the locating component 1132 may assign different confidence levels to different users, with the confidence levels indicating how likely it is that each corresponding user is the user that is in fact associated with the event of interest.

The locating component 1132 may access the sensor data 1124 in order to determine this location data of the user and/or items. The location data provides information indicative of a location of an object, such as the item 1004, the user 1016, the tote 1018, and so forth. The location may be absolute with respect to the facility 1002 or relative to another object or point of reference. Absolute terms may comprise a latitude, longitude, and altitude with respect to a geodetic reference point. Relative terms may include a location of 25.4 meters (m) along an x-axis and 75.2 m along a y-axis as designated by a floor plan of the facility 1002, 5.2 m from an inventory location 1014 along a heading of 169°, and so forth. For example, the location data may indicate that the user 1016(1) is 25.2 m along the aisle 1012(1) and standing in front of the inventory location 1014. In comparison, a relative location may indicate that the user 1016 (1) is 32 cm from the tote 1018 at a heading of 73° with respect to the tote 114. The location data may include orientation information, such as which direction the user 1016 is facing. The orientation may be determined by the relative direction the user's 1016 body is facing. In some implementations, the orientation may be relative to the interface device. Continuing the example, the location data may indicate that the user 1016(1) is oriented with a heading of 0°, or looking north. In another example, the location data may indicate that the user 1016 is facing towards the interface device.

The identification component 1134 is configured to identify an object. In one implementation, the identification component 1134 may be configured to identify an item 1004. In another implementation, the identification component 1134 may be configured to identify the user 1016. For example, the identification component 1134 may use facial recognition techniques to process the image data 1126 and determine the identity data of the user 1016 depicted in the images by comparing the characteristics in the image data 1126 with previously stored results. The identification component 1134 may also access data from other sensors 1020, such as from an RFID reader 1020, an RF receiver 1020, fingerprint sensors, and so forth.

The event determination component 1136 is configured to process the sensor data 1124 and generate output data 1026. The event determination component 1136 may access information stored in the data store 1118 including, but not limited to, event description data 1142, confidence levels 1144, or threshold values 1146.

The event description data 1142 comprises information indicative of one or more events 1024. For example, the event description data 1142 may comprise predefined profiles that designate movement of an item 1004 from an inventory location 1014 with the event 1024 of "pick". The event description data 1142 may be manually generated or automatically generated. The event description data 1142 may include data indicative of triggers associated with events occurring in the facility 1002. An event may be determined as occurring upon detection of the trigger. For example, sensor data 1124 such as a change in weight from a weight sensor 1020(6) at an inventory location 1014 may trigger detection of an event of an item 1004 being added or removed from the inventory location 1014. In another example, the trigger may comprise an image of the user 1016 reaching a hand toward the inventory location 1014. In yet another example, the trigger may comprise two or more users 1016 approaching to within a threshold distance of one another.

The event determination component 1136 may process the sensor data 1124 using one or more techniques including, but not limited to, artificial neural networks, classifiers, decision trees, support vector machines, Bayesian networks, and so forth. For example, the event determination component 1136 may use a decision tree to determine occurrence of the "pick" event 1024 based on sensor data 1124. The event determination component 1136 may further use the sensor data 1124 to determine one or more tentative results 1148. The one or more tentative results 1148 comprise data associated with the event 1024. For example, where the event 1024 comprises a disambiguation of users 1016, the tentative results 1148 may comprise a list of possible user 1016 identities. In another example, where the event 1024 comprises a disambiguation between items 104, the tentative results 1148 may comprise a list of possible item identifiers. In some implementations, the tentative result 1148 may indicate the possible action. For example, the action may comprise the user 1016 picking, placing, moving an item 1004, damaging an item 1004, providing gestural input, and so forth.

In some implementations, the tentative results 1148 may be generated by other components 1156. For example, the tentative results 1148 such as one or more possible identities or locations of the user 1016 involved in the event 1024 may be generated by the locating component 1132. In another example, the tentative results 1148 such as possible items 1004 that may have been involved in the event 1024 may be generated by the identification component 1134.

The event determination component 1136 may be configured to provide a confidence level 1144 associated with the determination of the tentative results 1148. The confidence level 1144 provides indicia as to the expected level of accuracy of the tentative result 1148. For example, a low confidence level 1144 may indicate that the tentative result 1148 has a low probability of corresponding to the actual circumstances of the event 1024. In comparison, a high confidence level 1144 may indicate that the tentative result 1148 has a high probability of corresponding to the actual circumstances of the event 1024.

In some implementations, the tentative results 1148 having confidence levels 1144 that exceed the threshold result 1136 may be deemed to be sufficiently accurate and thus may be used as the output data 1026. For example, the event determination component 1136 may provide tentative results 1148 indicative of the three possible items 1004(1), 1004(2), and 1004(3) corresponding to the "pick" event 1024. The confidence levels 1144 associated with the possible items 1004(1), 1004(2), and 1004(3) may be 25%, 70%, 132%, respectively. Continuing the example, the threshold result may be set such that confidence level 1144 of 130% are deemed to be sufficiently accurate. As a result, the event determination component 1136 may designate the "pick" event 1024 as involving item 1004(3).

The inquiry component 1138 may be configured to use at least a portion of the sensor data 1124 associated with the event 1024 to generate inquiry data 1150. In some implementations, the inquiry data 1150 may include one or more of the tentative results 1148 or supplemental data 1152. The inquiry component 1138 may be configured to provide inquiry data 1150 to one or more devices associated with one or more human associates.

An associate user interface is presented on the respective devices of associates. The associate may generate response data 1154 by selecting a particular tentative result 1148, entering new information, indicating that they are unable to answer the inquiry, and so forth.

The supplemental data 1152 comprises information associated with the event 1024 or that may be useful in interpreting the sensor data 1124. For example, the supplemental data 1152 may comprise previously stored images of the items 1004. In another example, the supplemental data 1152 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data 1126 during presentation to an associate.

The inquiry component 1138 processes the response data 1154 provided by the one or more associates. The processing may include calculating one or more statistical results associated with the response data 1154. For example, statistical results may include a count of the number of times associates selected a particular tentative result 1148, determination of a percentage of the associates that selected a particular tentative result 1148, and so forth.

The inquiry component 1138 is configured to generate the output data 1026 based at least in part on the response data 1154. For example, given that a majority of the associates returned response data 1154 indicating that the item 1004 associated with the "pick" event 1024 is item 1004(5), the output data 1026 may indicate that the item 1004(5) was picked.

The inquiry component 1138 may be configured to selectively distribute inquiries to particular associates. For example, some associates may be better suited to answering particular types of inquiries. Performance data, such as statistical data about the performance of the associates, may be determined by the inquiry component 1138 from the response data 1154 provided by the associates. For example, information indicative of a percentage of different inquiries in which the particular associate selected response data 1154 that disagreed with the majority of associates may be maintained. In some implementations, test or practice inquiry data 1150 having a previously known correct answer may be provided to the associate for training or quality assurance purposes. The determination of the set of associates to use may be based at least in part on the performance data.

By using the inquiry component 1138, the event determination component 1136 may be able to provide high reliability output data 1026 that accurately represents the event 1024. The output data 1026 generated by the inquiry component 1138 from the response data 1154 may also be used to further train the automated systems used by the inventory management system 1116. For example, the sensor data 1124 and the output data 1026, based on response data 1154, may be provided to one or more of the components of the inventory management system 1116 for training in process improvement. Continuing the example, this information may be provided to an artificial neural network, Bayesian network, and so forth, to further train these systems such that the confidence level 1144 and the tentative results 1148 produced in the future for the same or similar input is improved. It is also to be appreciated that while several example forms of data are described, the data stores 1118 may store any other type of data 1158.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
   one or more processors; and
   one or more computer-readable media storing computer-executable instructions that, when executed, cause the one or more processors to:
   receive, from a first device having a first microphone, first audio data representing a first instance of a speech utterance spoken at a first time;
   store the first audio data in association with a user profile;
   store, in association with the user profile, an indication that the first device having the first microphone generated the first audio data;
   receive, from a second device having a second microphone, second audio data representing a second instance of the speech utterance as spoken by a user at a second time that is after the first time;
   determine, using the indication, a relative transfer function to apply to the first audio data, the relative transfer function representing an acoustic relationship between the first microphone and the second microphone;
   apply the relative transfer function to the first audio data to generate third audio data;
   analyze the third audio data with respect to the second audio data; and
   determine that the user corresponds to the user profile.

2. The system as recited in claim 1, comprising further computer-executable instructions that, when executed, cause the one or more processors to associate a purchase transaction with the user profile, the purchase transaction involving a purchase of an item selected by the user.

3. The system as recited in claim 1, comprising further computer-executable instructions that, when executed, cause the one or more processors to access a relative-transfer-function database that stores at least the relative transfer function.

4. The system as recited in claim 1, comprising further computer-executable instructions that, when executed, cause the one or more processors to:
   receive, from the first device, first image data representing a first instance of a portion of a first user;
   store the first image data in association with the user profile;
   receive, from the second device, second image data representing a second instance of a portion of a second user;
   determine a difference between the first image data and the second image data;
   determine that the difference between the second image data and the first image data is less than a threshold difference;
   and wherein determining the relative transfer function comprises determining the relative transfer function to apply to the first audio data in response to determining that the difference is less than the difference threshold.

5. A method comprising:

receiving first audio data based on first audio captured by a first device, the first audio data representing a first instance of a speech utterance spoken by a user at a first time;

receiving first image data from at least one of the first device or a second device, the first image data representing the user that spoke the first instance of the speech utterance at the first time;

identifying a user profile based at least in part on the first image data, wherein the user profile is associated with second audio data, wherein the second audio data represents a second instance of the speech utterance as previously captured by a third device at a second time that is prior to the first time;

identifying, based at least in part on the user profile, a relative transfer function to apply to at least one of the first audio data or the second audio data; and applying the relative transfer function to the at least one of the first audio data or the second audio data to generate third audio data.

6. A method as recited in claim 5, wherein the relative transfer function represents an acoustic relationship between a first microphone of the first device and a second microphone of the third device.

7. A method as recited in claim 5, further comprising:
analyzing the third audio data; and
determining that the user corresponds to the user profile based at least in part on the analyzing.

8. A method as recited in claim 5, wherein the applying comprises applying the relative transfer function to the second audio data to generate the third audio data, and further comprising:
determining a difference between the third audio data and the first audio data; and
determining that the user corresponds to the user profile based at least in part on the difference.

9. A method as recited in claim 5, wherein the applying comprises applying the relative transfer function to the first audio data to generate the third audio data, and further comprising:
determining a difference between the third audio data and the second audio data; and
determining that the user corresponds to the user profile based at least in part on the difference.

10. A method as recited in claim 5, further comprising accessing a relative-transfer-function database that stores, for each device of multiple devices, an association between the respective device and a respective relative transfer function to apply to audio data generated by the respective device.

11. A method as recited in claim 5, further comprising:
determining first feature data associated with the first image data;
determining second feature data associated with second image data,
determining a difference between the first feature data and the second feature data; and
determining that the difference is less than a threshold difference;
and wherein the identifying the user profile comprises identifying the user profile based at least in part on determining that the difference is less than the threshold difference.

12. A method as recited in claim 5, further comprising associating a purchase transaction with the user profile, the purchase transaction involving a purchase of an item selected by the user.

13. A method as recited in claim 5, wherein the first audio data comprises at least one of a first audio signal or first feature data associated with the first audio signal, the second audio data comprises at least one of a second audio signal or second feature data associated with the second audio signal, and the third audio data comprises at least one of a third audio signal or third feature data associated with the third audio signal.

14. A method as recited in claim 5, wherein the user profile comprises a first user profile, the relative transfer function comprises a first relative transfer function and further comprising:
identifying a second user profile based at least in part on the first image data, the second user profile associated with fourth audio data;
identifying, from the second user profile, a second relative transfer function to apply to at least one of the first audio data or the fourth audio data; and
applying the second relative transfer function to the at least one of the first audio data or the fourth audio data to generate fifth audio data.

15. A method as recited in claim 5, wherein the relative transfer function comprises a first relative transfer function, and the applying comprises applying the first relative transfer function to the second audio data, and further comprising:
applying a second relative transfer function to the first audio data to generate fourth audio data;
determining a difference between the third audio data and the fourth audio data; and
determining that the user corresponds to the user profile based at least in part on the difference.

16. A system comprising:
one or more processors; and
one or more computer-readable media storing computer-executable instructions that, when executed, cause the one or more processors to:
receive first audio data based on first audio captured by a first device, the first audio data representing a first instance of a speech utterance spoken by a user at a first time;
receive first image data from at least one of the first device or a second device, the first image data representing the user that spoke the first instance of the speech utterance at the first time;
identify a user profile based at least in part on the first image data, wherein the user profile is associated with second audio data, wherein the second audio data represents a second instance of the speech utterance spoken at a second time that is prior to the first time;
identify, based at least in part on the user profile, a relative transfer function to apply to at least one of the first audio data or the second audio data; and
apply the relative transfer function to the at least one of the first audio data or the second audio data to generate third audio data.

17. A system as recited in claim 16, wherein the relative transfer function represents an acoustic relationship between a first microphone of the first device and a second microphone of a third device that generated the second audio data.

18. A system as recited in claim 16, comprising further computer-executable instructions that, when executed, cause the one or more processors to:
analyze the third audio data; and
determine that the user corresponds to the user profile based at least in part on the analyzing.

19. A system as recited in claim 16, wherein the computer-executable instructions that, when executed, cause the one or more processor to apply the relative transfer function to the at least one of the first audio data or the second audio data comprise computer-executable instructions that, when executed, cause the one or more processors to apply the relative transfer function to the second audio data, and further comprising computer-executable instructions that, when executed, cause the one or more processors to:
   determine a difference between the third audio data and the first audio data; and
   determine that the user corresponds to the user profile based at least in part on the difference.

20. A system as recited in claim 16, wherein the computer-executable instructions that, when executed, cause the one or more processor to apply the relative transfer function to the at least one of the first audio data or the second audio data comprise computer-executable instructions that, when executed, cause the one or more processors to apply the relative transfer function to the first audio data, and further comprising computer-executable instructions that, when executed, cause the one or more processors to:
   determine a difference between the third audio data and the second audio data; and
   determine that the user corresponds to the user profile based at least in part on the difference.

21. A method comprising:
   receiving first audio data based on first audio captured by a first device, the first audio data representing first speech spoken by a user at a first time;
   receiving first image data representing the user;
   identifying a user profile associated with the user, wherein the user profile is associated with second audio data;
   identifying, based at least in part on the user profile, a relative transfer function to apply to at least one of the first audio data or the second audio data; and
   applying the relative transfer function to the at least one of the first audio data or the second audio data to generate third audio data.

22. A method comprising:
   receiving first audio data based on first audio captured by a first device, the first audio data representing first speech spoken by a user at a first time;
   receiving first image data representing the user;
   identifying a user profile associated with the user, wherein the user profile is associated with second audio data; and
   applying a relative transfer function to at least one of the first audio data or the second audio data to generate third audio data.

\* \* \* \* \*